United States Patent
Parashar et al.

(10) Patent No.: US 11,588,854 B2
(45) Date of Patent: Feb. 21, 2023

(54) USER INTERFACE FOR DEFINING SECURITY GROUPS

(71) Applicant: VMWARE, INC., Palo Alto, CA (US)

(72) Inventors: Shrinivas Sharad Parashar, Pune (IN); Sarat Chandra Annadata, Pune (IN); Arun Yeshwantrao Nagargoje, Pune (IN); Shivaraj Vasantrao Patil, Pune (IN)

(73) Assignee: VMWARE, INC., Palo Alto, CA (US)

( * ) Notice: Subject to any disclaimer, the term of this patent is extended or adjusted under 35 U.S.C. 154(b) by 88 days.

(21) Appl. No.: 16/799,871

(22) Filed: Feb. 25, 2020

(65) Prior Publication Data
US 2021/0194931 A1 Jun. 24, 2021

(30) Foreign Application Priority Data
Dec. 19, 2019 (IN) .............................. 201941052876

(51) Int. Cl.
| | |
|---|---|
| *H04L 9/40* | (2022.01) |
| *G06F 9/451* | (2018.01) |
| *G06F 9/455* | (2018.01) |
| *H04L 43/08* | (2022.01) |
| *G06F 3/04847* | (2022.01) |
| *H04L 61/5007* | (2022.01) |

(52) U.S. Cl.
CPC .......... *H04L 63/20* (2013.01); *G06F 3/04847* (2013.01); *G06F 9/451* (2018.02); *G06F 9/45558* (2013.01); *H04L 43/08* (2013.01); *G06F 2009/45595* (2013.01); *H04L 61/5007* (2022.05)

(58) Field of Classification Search
None
See application file for complete search history.

(56) References Cited

U.S. PATENT DOCUMENTS

| | | | |
|---|---|---|---|
| 7,849,502 B1 | 12/2010 | Bloch et al. | |
| 8,605,655 B1 | 12/2013 | Sahai et al. | |
| 9,215,213 B2 | 12/2015 | Bansal et al. | |
| 9,438,560 B2 | 9/2016 | Mohanty et al. | |

(Continued)

OTHER PUBLICATIONS

Ghafir, Ibrahim, et al., "A Survey on Network Security Monitoring Systems," 2016 IEEE 4th International Conference on Future Internet of Things and Cloud Workshops, Aug. 22-24, 2016, 6 pages, IEEE, Vienna, Austria.

(Continued)

*Primary Examiner* — Yongjia Pan
*Assistant Examiner* — Haimei Jiang
(74) *Attorney, Agent, or Firm* — Adeli LLP

(57) ABSTRACT

Some embodiments provide a method for defining security groups in a network. In a user interface, the method displays (i) a set of existing security groups and (ii) a set of recommend security groups based on monitored network flows in the network. Each existing security group and recommended security group includes at least one data compute node (DCN). The method provides a user interface tool for (i) accepting recommended security groups to be part of the set of existing security groups and (ii) adding DCNs from the recommended security groups to the existing security groups. Security rules are defined and implemented in the network for DCNs belonging to existing security groups.

20 Claims, 18 Drawing Sheets

(56) References Cited

U.S. PATENT DOCUMENTS

| | | |
|---|---|---|
| 9,438,634 B1 | 9/2016 | Ross et al. |
| 9,467,476 B1 | 10/2016 | Shieh et al. |
| 9,787,641 B2 | 10/2017 | Bansal et al. |
| 10,298,619 B2 | 5/2019 | Nimmagadda et al. |
| 10,419,321 B2 | 9/2019 | Raman et al. |
| 10,567,440 B2 | 2/2020 | Bansal et al. |
| 10,608,993 B2 | 3/2020 | Bansal et al. |
| 10,728,121 B1* | 7/2020 | Chitalia ............... H04L 41/12 |
| 10,742,673 B2 | 8/2020 | Tiagi et al. |
| 10,846,117 B1 | 11/2020 | Steinberg |
| 11,018,970 B2 | 5/2021 | Raman et al. |
| 2003/0120955 A1 | 6/2003 | Bartal et al. |
| 2005/0198247 A1* | 9/2005 | Perry ................... H04L 7/0008 709/223 |
| 2005/0262554 A1 | 11/2005 | Brooks et al. |
| 2007/0011734 A1 | 1/2007 | Balakrishnan et al. |
| 2008/0037423 A1 | 2/2008 | Singh et al. |
| 2008/0059596 A1 | 3/2008 | Ogawa |
| 2008/0196102 A1 | 8/2008 | Roesch |
| 2008/0267186 A1 | 10/2008 | Boukis et al. |
| 2008/0282335 A1 | 11/2008 | Abzarian et al. |
| 2009/0279547 A1 | 11/2009 | Mistry et al. |
| 2009/0300341 A1 | 12/2009 | Buehler et al. |
| 2010/0106764 A1 | 4/2010 | Chadwick et al. |
| 2010/0107085 A1 | 4/2010 | Chadwick et al. |
| 2010/0293544 A1 | 11/2010 | Wilson et al. |
| 2010/0325199 A1 | 12/2010 | Park et al. |
| 2010/0332262 A1 | 12/2010 | Horvitz et al. |
| 2011/0208824 A1* | 8/2011 | Lidstrom ............. H04W 48/18 709/206 |
| 2012/0011284 A1 | 1/2012 | Filali-Adib et al. |
| 2012/0131591 A1 | 5/2012 | Moorthi et al. |
| 2012/0151408 A1* | 6/2012 | Groth .................. G06F 3/0481 715/799 |
| 2012/0226808 A1 | 9/2012 | Morgan |
| 2012/0317566 A1 | 12/2012 | Santos et al. |
| 2013/0031037 A1 | 1/2013 | Brandt et al. |
| 2013/0067090 A1 | 3/2013 | Batrouni et al. |
| 2013/0159865 A1* | 6/2013 | Smith .................. H04L 41/22 715/737 |
| 2013/0185413 A1 | 7/2013 | Beaty et al. |
| 2014/0245423 A1 | 8/2014 | Lee |
| 2014/0373091 A1 | 12/2014 | Kimer et al. |
| 2015/0019569 A1* | 1/2015 | Parker ................ G06F 16/338 707/748 |
| 2015/0135003 A1 | 5/2015 | Cota-Robles et al. |
| 2015/0199513 A1 | 7/2015 | Ismael et al. |
| 2015/0236935 A1 | 8/2015 | Bassett |
| 2015/0269383 A1 | 9/2015 | Lang et al. |
| 2015/0358288 A1 | 12/2015 | Jain et al. |
| 2015/0358391 A1 | 12/2015 | Moon et al. |
| 2016/0110211 A1 | 4/2016 | Kames |
| 2016/0112443 A1 | 4/2016 | Grossman et al. |
| 2016/0156591 A1 | 6/2016 | Zhou et al. |
| 2016/0191463 A1 | 6/2016 | Mohanty et al. |
| 2016/0205002 A1 | 7/2016 | Rieke et al. |
| 2016/0219068 A1 | 7/2016 | Lee et al. |
| 2016/0294987 A1 | 10/2016 | Tian et al. |
| 2016/0323318 A1 | 11/2016 | Terrill et al. |
| 2016/0350683 A1 | 12/2016 | Bester et al. |
| 2016/0380848 A1 | 12/2016 | Raney |
| 2017/0005986 A1 | 1/2017 | Bansal et al. |
| 2017/0019487 A1 | 1/2017 | Maheshwari et al. |
| 2017/0078168 A1 | 3/2017 | Harris et al. |
| 2017/0118102 A1 | 4/2017 | Majumder et al. |
| 2017/0126727 A1 | 5/2017 | Beam et al. |
| 2017/0171159 A1 | 6/2017 | Kumar et al. |
| 2017/0207968 A1 | 7/2017 | Eicken et al. |
| 2017/0222977 A1 | 8/2017 | Newell et al. |
| 2017/0293994 A1 | 10/2017 | Li et al. |
| 2017/0324632 A1 | 11/2017 | Arora |
| 2017/0324765 A1 | 11/2017 | McLaughlin et al. |
| 2017/0359217 A1 | 12/2017 | Ahuja et al. |
| 2017/0374102 A1 | 12/2017 | Woolward |
| 2017/0374106 A1 | 12/2017 | Hamou et al. |
| 2018/0007127 A1 | 1/2018 | Salapura et al. |
| 2018/0027080 A1 | 1/2018 | Yang et al. |
| 2018/0032399 A1 | 2/2018 | Johnson et al. |
| 2018/0034856 A1 | 2/2018 | Mallya |
| 2018/0041578 A1 | 2/2018 | Lee et al. |
| 2018/0048623 A1 | 2/2018 | Bansal et al. |
| 2018/0077119 A1 | 3/2018 | Fields et al. |
| 2018/0077189 A1 | 3/2018 | Doppke et al. |
| 2018/0084034 A1 | 3/2018 | Netto et al. |
| 2018/0088964 A1 | 3/2018 | Hussain et al. |
| 2018/0101371 A1 | 4/2018 | Flanakin et al. |
| 2018/0115586 A1 | 4/2018 | Chou et al. |
| 2018/0123907 A1 | 5/2018 | Raman et al. |
| 2018/0123939 A1 | 5/2018 | Raman et al. |
| 2018/0145999 A1 | 5/2018 | Ertugrul et al. |
| 2018/0167405 A1 | 6/2018 | Comay et al. |
| 2018/0176102 A1* | 6/2018 | Bansal ................. H04L 43/026 |
| 2018/0176252 A1* | 6/2018 | Nimmagadda ..... H04L 41/0893 |
| 2018/0176261 A1* | 6/2018 | Bansal ................ H04L 41/0893 |
| 2018/0295148 A1* | 10/2018 | Mayorgo ............... H04W 4/70 |
| 2018/0329958 A1* | 11/2018 | Choudhury ......... G06F 16/2343 |
| 2018/0332006 A1* | 11/2018 | Zhao ................... H04L 63/0263 |
| 2019/0180141 A1 | 6/2019 | Tiagi et al. |
| 2019/0182276 A1 | 6/2019 | Tiagi et al. |
| 2019/0230064 A1 | 7/2019 | Soman |
| 2019/0386891 A1 | 12/2019 | Chitalia et al. |
| 2020/0073694 A1 | 3/2020 | Wallach |
| 2021/0194849 A1 | 6/2021 | Parashar et al. |

OTHER PUBLICATIONS

Lee, Hanseung, et al., "iVisClustering: An Interactive Visual Document Clustering via Topic Modeling," EuroVis12: Eurographics Conference on Visualization, vol. 31, No. 3, Jun. 2012, 10 pages, The Eurographics Association and Blackwell Publishing Ltd., Oxford, UK, and MA, USA.

Niu, Xiangyu, et al., "Network Steganography based on Traffic Behavior in Dynamically Changing Wireless Sensor Networks," 2015 IEEE International Conference on Communications, Jun. 8-12, 2015, 6 pages, IEEE, London, UK.

Anwar, Mahwish, "Virtual Firewalling for Migrating Virtual Machines in Cloud Computing," 2013 5th International Conference on Information and Communication Technologies, Dec. 14-15, 2013, 11 pages, IEEE, Karachi, Pakistan.

Blei, David M., "Probabilistic Topic Models," Communications of the ACM, Apr. 2012, 8 pages, vol. 55, No. 4, ACM, New York, New York, USA.

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

Maheshwari, Ritu, et al., "Private Virtual Cloud Infrastructure Modelling using 'VCPHCF-RTT' Security Agent," 2018 4th International Conference on Computing Communication and Automation (ICCCA), Dec. 14-15, 2018, 5 pages, IEEE, Greater Noida, India.

Mimno, David, et al., "Bayesian Checking for Topic Models," Proceedings of the Conference on Empirical Methods in Natural Language Processing, Jul. 27-31, 2011, 11 pages, ACL, Edinburgh, Scotland, UK.

Non-Published commonly owned related U.S. Appl. No. 16/799,868 with similar specification, filed Feb. 25, 2020, 45 pages, VMware, Inc.

Steyvers, Mark, et al., "Probabilistic Topic Models," Handbook of Latent Semantic Analysis, Month Unknown 2007, 15 pages, Laurence Erlbaum Associates.

Münz, Gerhard, et al., "Traffic Anomaly Detection Using K-Means Clustering," GI/ITG Workshop MMBnet, Month Unknown 2007, 8 pages, retrieved from https://www.net.in.turn.de/fileadmin/TUM/members/muenz/documents/muenz07k-means.pdf.

Author Unknown, "Network Visualization nuVML Virtual Modeling Lab Quick Start Guide," Jun. 12, 2017, 20 pages, Speak Network Solutions, USA, Retrieved from https://www.speaknetworks.com/nuvml-quick-start-guide/.

(56) References Cited

OTHER PUBLICATIONS

Shan, Rongsheng, et al., "Network Security Policy for Large-Scale VPN," International Conference on Communication Technology Proceedings 2003, Apr. 9-11, 2003, 4 pages, IEEE, Beijing, China.

* cited by examiner

USER INTERFACE FOR DEFINING SECURITY GROUPS

RELATED APPLICATIONS

Benefit is claimed under 35 U.S.C. 119(a)-(d) to Foreign Application Serial No. 201941052876 filed in India entitled "USER INTERFACE FOR DEFINING SECURITY GROUPS", on Dec. 19, 2019, by VMWARE, Inc., which is herein incorporated in its entirety by reference for all purposes.

BACKGROUND

Typical visualizations of network flows do not currently scale for large amounts of data, leading to added user-end efforts to define security groups and firewall rules for the security groups and for micro-segmentation of the network environment. Presentation of these large amounts of data and data points in an intuitive format, however, is critical for ease of analysis before accepting recommendations or making changes to firewall configurations. Thus, improvements in the approach to visualizing flows in a network environment is required.

BRIEF SUMMARY

Some embodiments provide a network visualization application for visualizing and defining security groups and flows in a network. The network visualization application aggregates network flows (e.g., by data compute nodes (DCNs) and/or security groups) and provides a scalable and filterable user interface visualization of the network flows at a security group level. This user interface (UI) of some embodiments provides the capability to drill down into details of specific security groups, flows, and/or DCNs in the network. In some embodiments, the network visualization application also provides (e.g., in a visual manner in the UI) recommendations for new security groups and/or security rules alongside existing security groups.

In some embodiments, the network visualization application receives (e.g., from a network manager) data regarding the flows between DCNs (e.g., VMs, containers, IP addresses that cannot be resolved into specific VMs or other DCNs) in the network. The visualization application aggregates the flows between DCNs in pairs of security groups, and displays the aggregated network flows in the scalable UI visualization. In some embodiments, the scalable UI allows a user to view many DCNs (e.g., hundreds) in the same display while also providing the ability to zoom in on specific security groups, sets of security groups, and individual DCNs. In some embodiments, DCNs that have been organized into security groups are shown as individual entities (e.g., cubes, cylinders, etc.) within a plane that represents the boundaries of the security group. In some embodiments, a subset of items representing DCNs that have not been resolved into an existing or recommended security group (and therefore without specified firewall rules) may be displayed without any apparent boundaries in the scalable UI.

Some embodiments provide a filtering tool in the user interface to enable visualization of specific flows between the security groups and/or the individual DCNs. For instance, the filtering tool of some embodiments allows a user to filter the flows that are displayed in the UI to include or exclude allowed flows, blocked flows, and/or unsecured flows to which no firewall rules are applied. Each of these different flow types is represented in the UI with a different appearance (e.g., a different color) in some embodiments.

In some embodiments, a user can select a specific security group or DCN in the UI, thereby causing the UI to highlight and focus on the selected security group or DCN as well as any network flows associated with the selected security group or DCN. For instance, if a specific security group is selected, then the UI displays aggregated flows between any DCNs in that security group and DCNs in other security groups. Some embodiments collectively represent multiple flows between DCNs in a pair of security groups in the display using a single flow line between the pair of security groups, thus reducing clutter in the user interface. In some embodiments, a flow line between a pair of security groups includes a notation that indicates a number of flows represented by the flow line. If a specific DCN is selected, the UI displays flows between that DCN and any other DCNs in other security groups.

As mentioned, the network visualization application of some embodiments displays both existing security groups as well as a set of recommended security groups, which are based on monitored network flows in the network. In some embodiments, a network manager (e.g., a network virtualization manager) that monitors network flows between the plurality of security groups provides data regarding the network flows to the visualization application (which may be incorporated into the network manager or operate as a separate application). In some embodiments, the UI includes a tool that enables a user to define a subset of the plurality of security groups to be monitored by the network manager.

Within this UI, some embodiments provide a tool for further defining security groups. For example, in some embodiments, the user interface tool enables a user to accept recommended security groups to be part of the set of existing security groups and/or add DCNs from the recommended security groups to the existing security groups. In addition, some embodiments further allow the user to provide instructions to remove a particular existing security group or merge a recommended security group with an existing security group. Security rules (i.e., firewall rules), in some embodiments, are defined and implemented in the network for DCNs belonging to existing security groups. As mentioned, some embodiments display recommended security rules along with the recommended security groups.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a network visualization application for visualizing and defining security groups and flows in a network. The network visualization application aggregates network flows (e.g., by data compute nodes (DCNs) and/or security groups) and provides a scalable and filterable user interface visualization of the network flows at a security group level. This user interface (UI) of some embodiments provides the capability to drill down into details of specific security groups, flows, and/or DCNs in the network. In some embodiments, the network visualization application also provides (e.g., in a visual manner in the UI) recommendations for new security groups and/or security rules alongside existing security groups.

Figure 1:
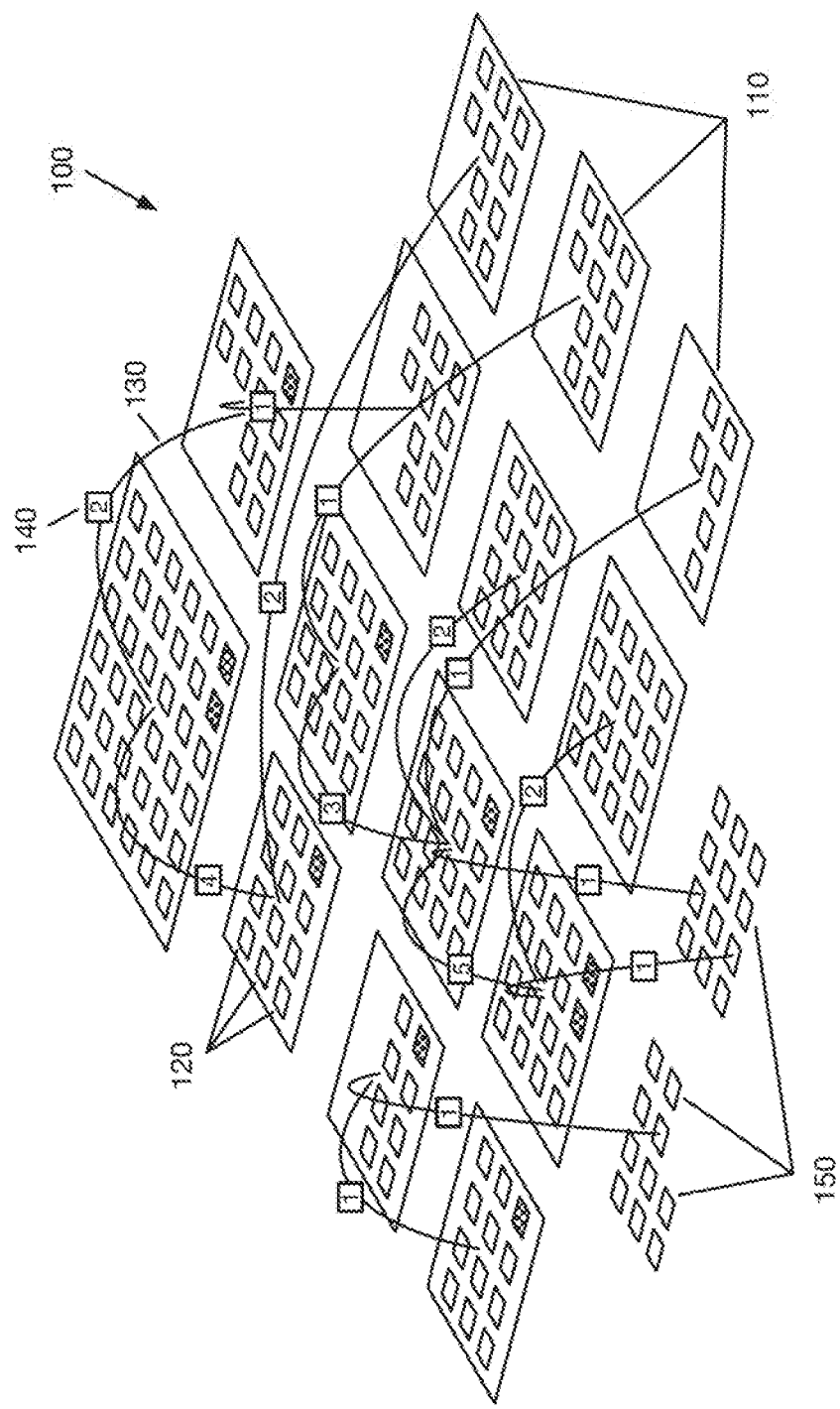
FIG. 1 conceptually illustrates an example embodiment of a scalable user interface display showing security groups and IP sets, aggregated flows between the security groups and IP sets, and unresolved VMs/IPs in a network.

FIG. 1 illustrates a scalable UI display 100 of some embodiments provided by a network visualization application for visualizing network flows between DCNs (e.g., virtual machines (VMs), containers, IP addresses that cannot be resolved into specific VMs or other DCNs) in a network. The visualization application in some embodiments aggregates flows between DCNs 120 in pairs of security groups 110, and displays the aggregated flows 130 in the scalable UI visualization 100. To eliminate unnecessary clutter in some embodiments, the scalable UI visualization displays flows between security groups with a flow line that includes a notation that indicates the number of flows represented by the flow line. For example, the scalable UI visualization 100 includes a flow line 130 having a notation 140 indicating there are two (2) flows between the pair of security groups.

In some embodiments, the scalable UI allows a user to view many DCNs (e.g., hundreds) in the same display, while also providing the ability to zoom in on specific security groups, sets of security groups, and individual DCNs. Such capabilities will be described in further detail below with reference to FIGS. 2-7. As illustrated by FIG. 1, some embodiments show DCNs that have been organized into security groups as individual entities (e.g., cubes, cylinders, etc.) within a plane that represents the boundaries of the security group. In some embodiments, a subset of items representing DCNs (e.g., DCNs 150) that have not been resolved into an existing or recommended security group (and therefore without specified firewall rules) may be displayed without any apparent boundaries in the scalable UI. It should be noted that while the drawings described herein depict DCNs as 2-Dimensional entities, some embodiments of the network visualization application provide scalable, isometric, 3-Dimensional depictions of the individual entities of the network.

Some embodiments provide a filtering tool in the user interface to enable visualization of specific flows between the security groups and/or the individual DCNs. For instance, the filtering tool of some embodiments allows a user to filter the flows that are displayed in the UI to include or exclude allowed flows, blocked flows, and/or unsecured flows to which no firewall rules are applied. Each of these different flow types is represented in the UI with a different appearance (e.g., a different color) in some embodiments.

In some embodiments, a user can select a specific security group or DCN in the UI, thereby causing the UI to highlight and focus on the selected security group or DCN as well as any network flows associated with the selected security group or DCN. For instance, if a specific security group is selected, then the UI displays aggregated flows between any DCNs in that security group and DCNs in other security groups. As mentioned above, some embodiments collectively represent multiple flows between DCNs in a pair of security groups in the display using a single flow line between the pair of security groups, thus reducing clutter in the user interface. In some embodiments, a flow line between a pair of security groups includes a notation that indicates a number of flows represented by the flow line. If a specific DCN is selected, the UI displays flows between that DCN and any other DCNs in other security groups.

Figure 2:
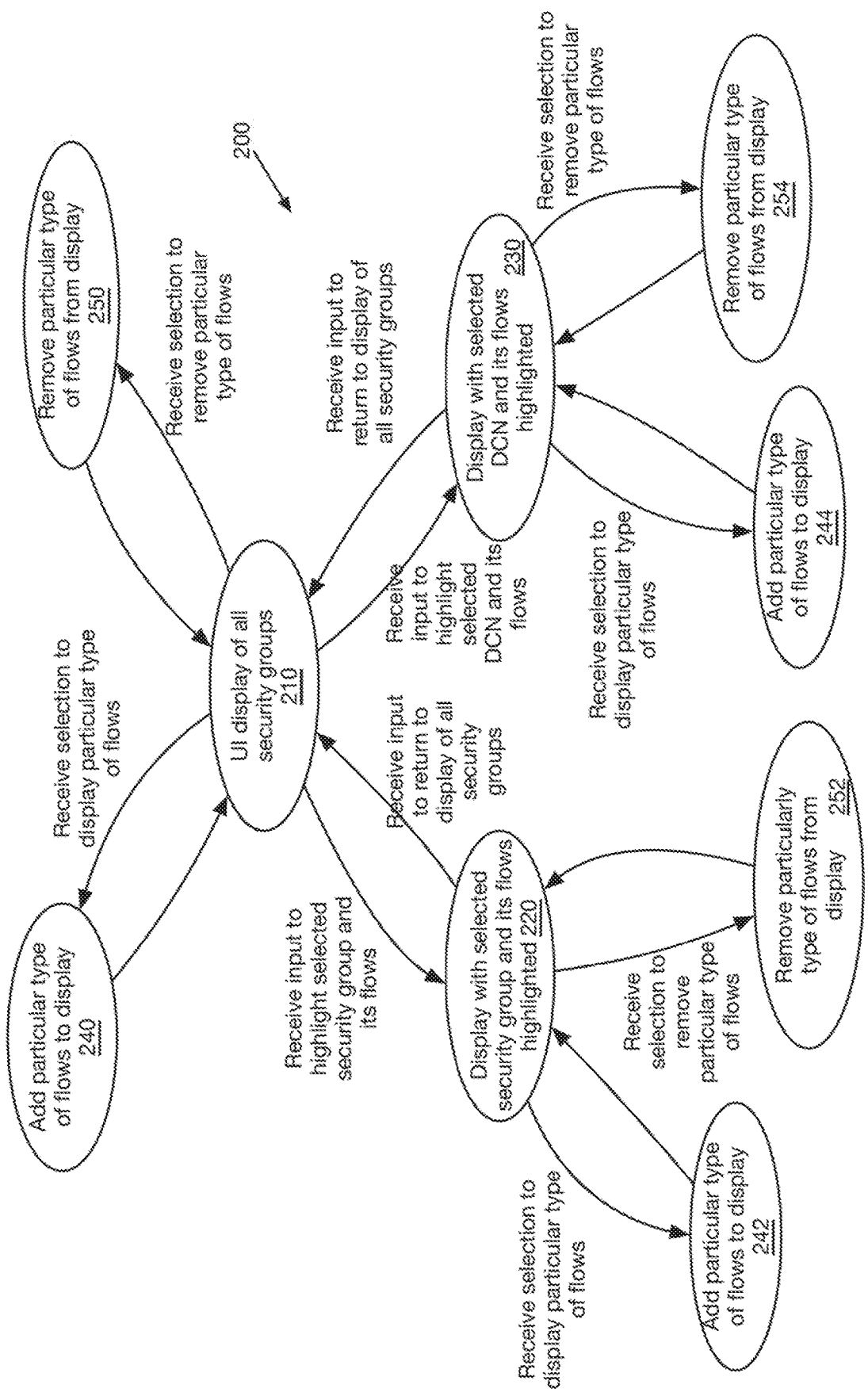
FIG. 2 conceptually illustrates a state diagram describing different states and transitions between these states of the scalable user interface of some embodiments.

FIG. 2 illustrates a state diagram 200 describing different states of the scalable UI and transitions between these states of some embodiments. One of ordinary skill in the art will recognize that the application of some embodiments will have many different states relating to all different types of input events, and that the state diagram 200 is specifically focused on a subset of these events. One of ordinary skill in the art will further recognize that various interactions, such as cursor controller gestures and button clicks, keyboard input, touchpad/trackpad input, etc., may be used for selection operations described herein. The state diagram 200 will be described by reference to FIGS. 3-5, which illustrate examples of a scalable UI of a network visualization application and modifications within that UI.

The network visualization application is initially in state 210 in some embodiments, featuring a scalable UI display of security groups and aggregated flows between the security groups (e.g., UI display 100). This may be the initial state of the network visualization application upon a user opening the display, after flow monitoring has been performed (e.g., by a separate back-end controller or other application), or based on other actions. In this state, none of the specific security groups or DCNs belonging to the security groups are selected or highlighted, as is the case in FIG. 1.

Figure 3A:
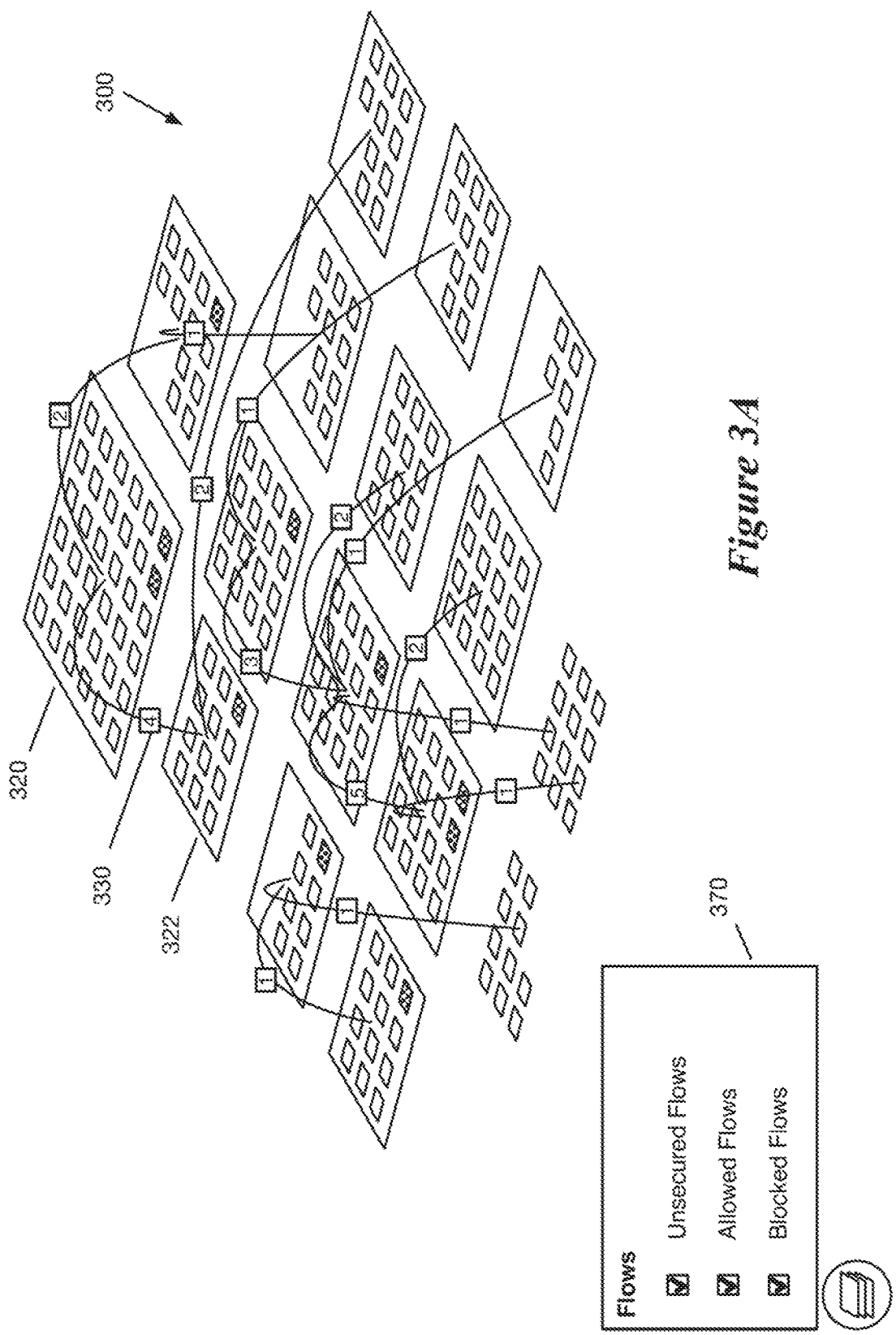
FIGS. 3A-3C conceptually illustrate different states of the scalable user interface display in which a user is provided a filtering tool for filtering out various flow types according to some embodiments.

From state 210, a user can perform numerous operations to modify the UI display by selecting objects within the display and/or using, for example, a filtering tool provided by the network visualization application (e.g., within the display). FIG. 3A illustrates an example of such a filtering tool 370 within a UI display 300. The filtering tool 370 provides a user with the ability to select certain types of flows (e.g., unsecured flows, allowed flows, and blocked flows) to be shown in the scalable UI display 300. While the example embodiment illustrated by FIG. 3A shows that all flow types have been selected in the filtering tool 370, thereby causing all aggregated flows between the security groups to be shown in the UI display 300, any combination of flow types may be selected and displayed.

In some embodiments, allowed flows include any flows for which a user has defined one or more security rules (e.g., firewall rules) that allow the the flow. Similarly, blocked flows include any flows for which a user has defined one or more security rules that explicitly do not allow (i.e., block) the flow. In some embodiments, unsecured flows include any flows for which security rules have yet to be defined. For example, in some embodiments, unsecured flows may arise when changes are made to the security groups (e.g., addition or deletion of DCNs or whole security groups), new DCNs are created/added to the network, etc. In some such embodiments, a user may choose to either allow or block the flow by defining one or more security rules for the flow.

In some embodiments, the network visualization application may receive a selection, e.g., via filtering tool 370, to add or remove one or more flow types to/from the UI display 300. When the network visualization application receives a selection to add a particular flow type to the display, the application transitions to state 240 to add the selected flow type to the UI display 300, then returns to state 210 (with the flows of the selected flow type now included in the display). When the network visualization application receives a selection to remove (i.e., deselect) a particular flow type from the UI display 300, the application transitions to state 250 to remove the selected flow type to the UI display 300, then returns to state 210 (with the flows of the selected flow type no longer included in the display).

Figure 3B:
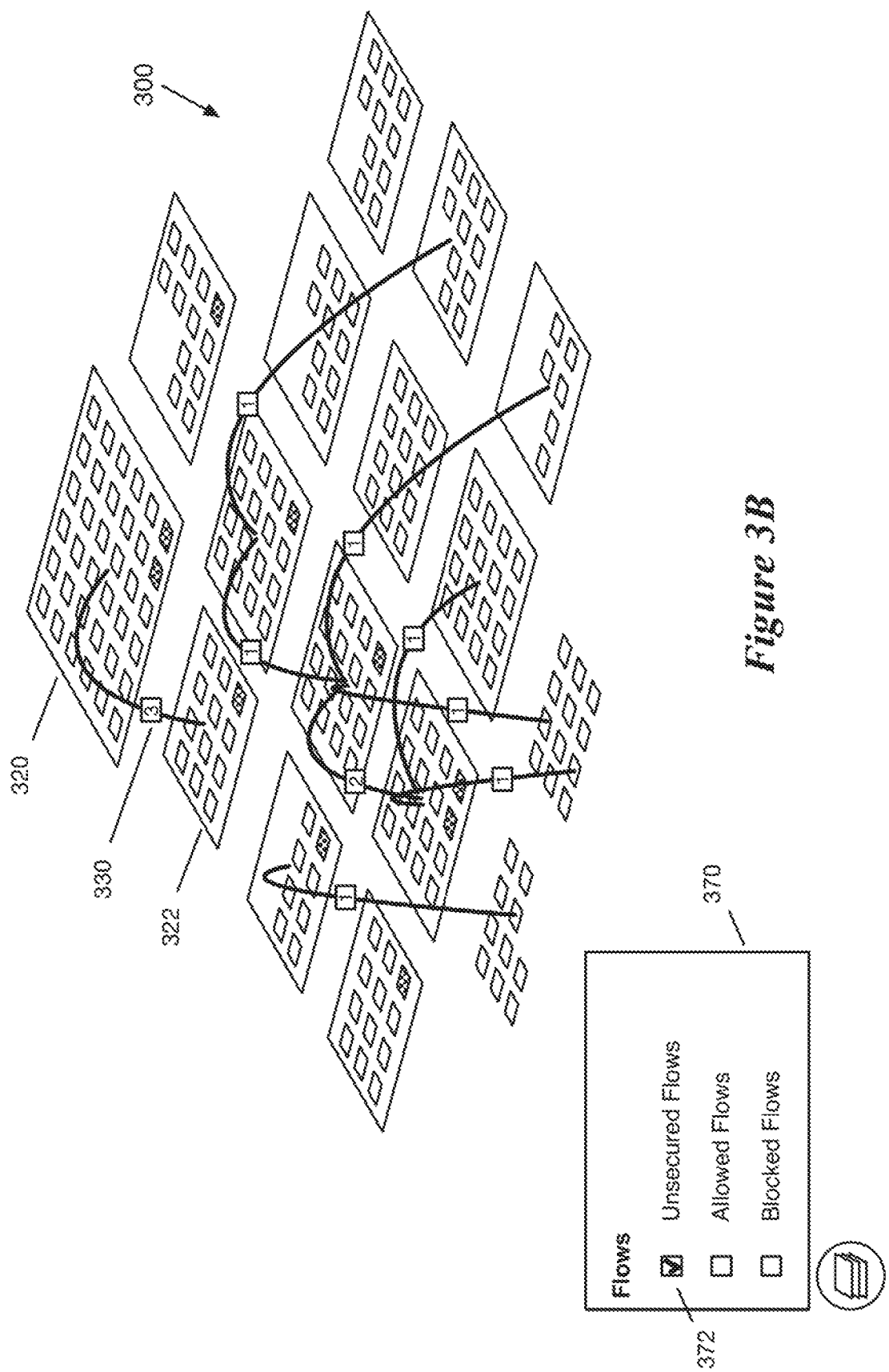

For example, FIG. 3B illustrates such a transition in which "Allowed Flows" and "Blocked Flows", which were shown as selected in FIG. 3A, have been deselected using the filtering tool 370, leaving only "Unsecured Flows" 372 selected. As shown, the number of flow lines, the number of flows represented by each of the flow lines, and the appearance of the flow lines has change between FIG. 3A and FIG. 3B due to the removal of the allowed and blocked flows. For instance, the flow line 330 between security group 320 and security group 322 previously represented 4 flows between security groups 320 and 322 and now represents only 3 flows between these security groups 320 and 322 (shown by the indicator displayed with the flow line). It should also be noted that while the embodiment illustrated by FIG. 3B shows the unsecured flows depicted using a thicker line than that used for all flows in FIG. 3A, some embodiments may instead represent different flow types using other methods (e.g., assigning different colors to represent different flow types).

Figure 3C:
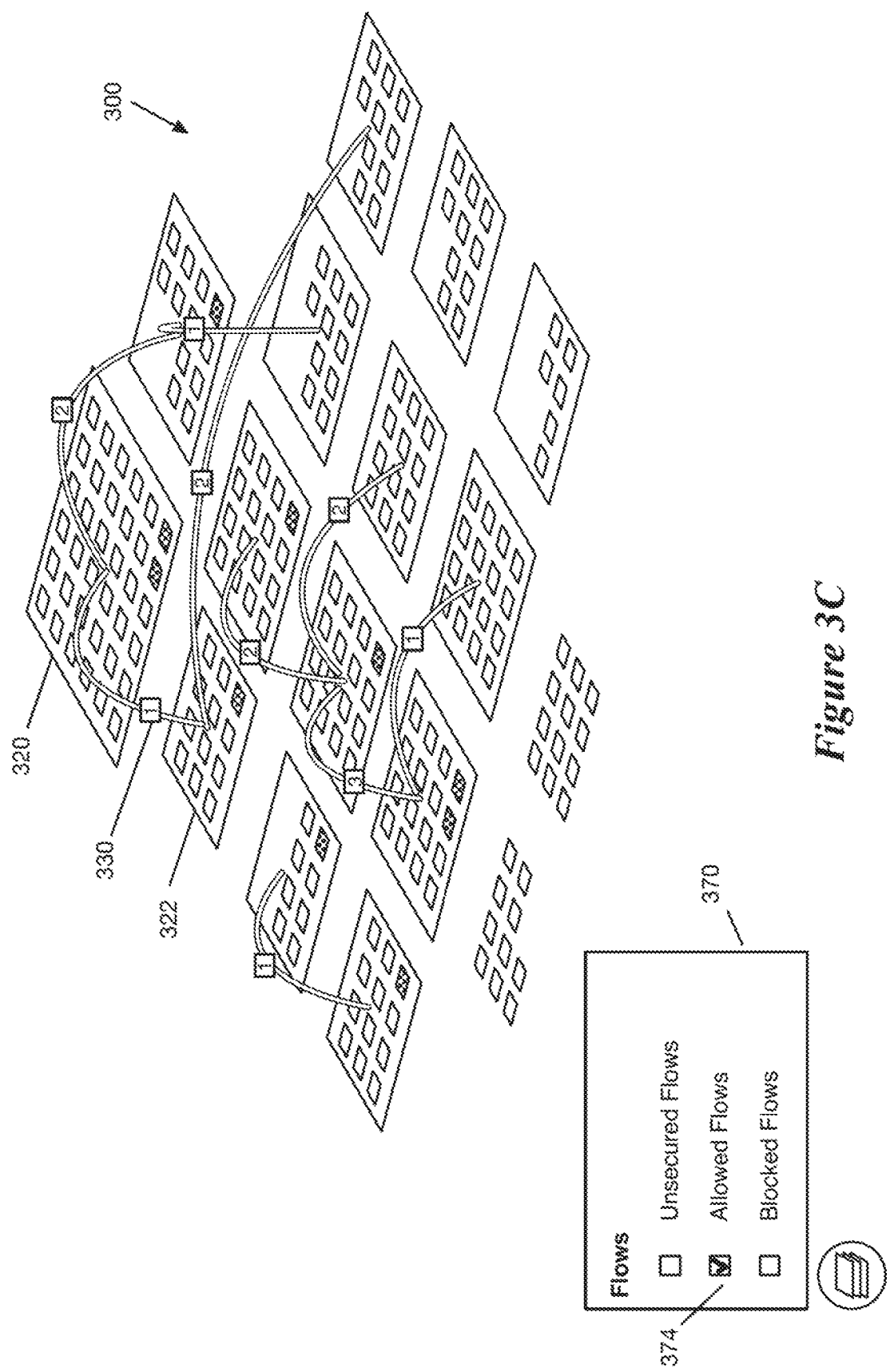

FIG. 3C illustrates another example embodiment of flow-type selection in which "Allowed Flows" 374 is selected, while "Unsecured Flows" is no longer selected (i.e., deselected). As with the transition described above between FIG. 3A and FIG. 3B, the number of flow lines, number of flows represented by the flow lines, and appearance of the flow lines has changed from FIG. 3B to FIG. 3C as a result of the selections within the filtering tool. For instance, the flow line 330 between security group 320 and security group 322 now represents only 1 flow between these security groups 320 and 322 (shown by the indicator displayed with the flow line) in FIG. 3C.

Figure 4:
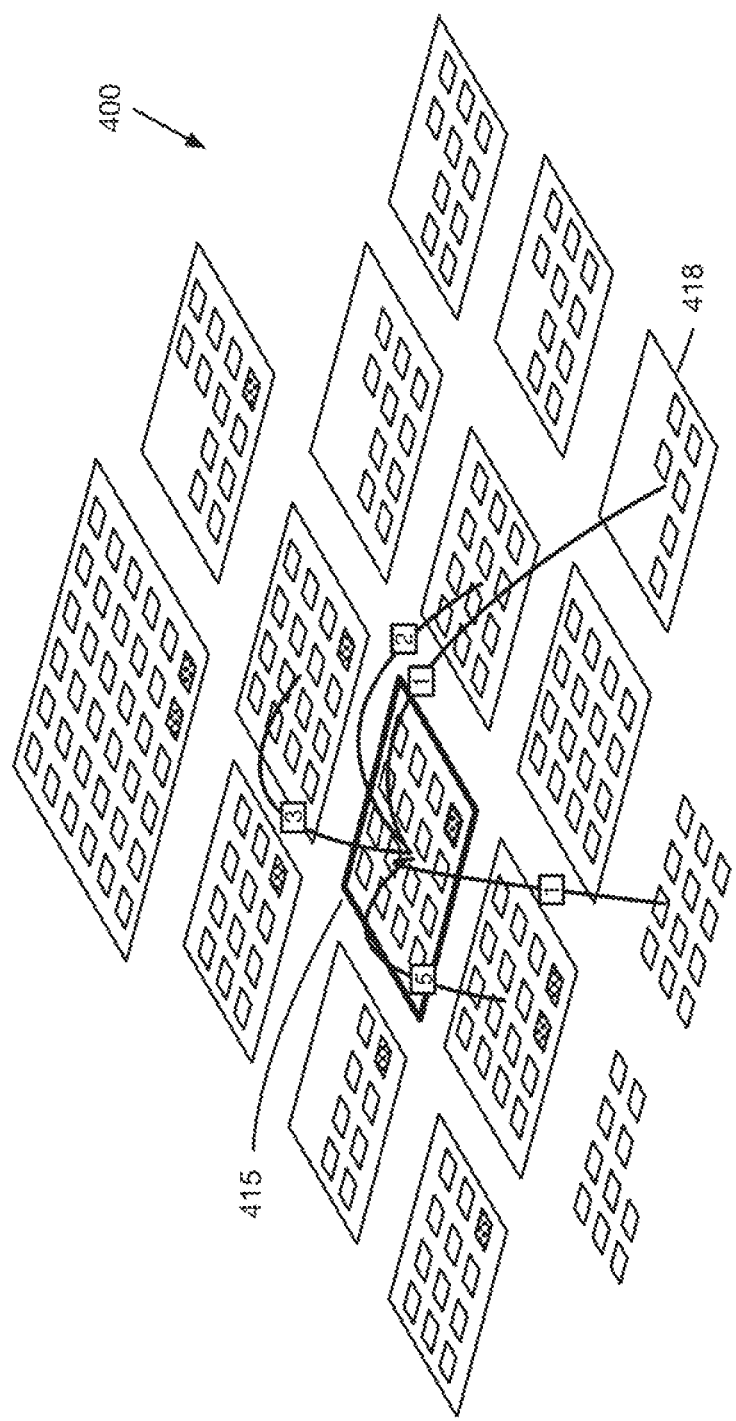
FIG. 4 conceptually illustrates the scalable user interface display in which a user has selected a particular security group according to some embodiments.

In addition to selecting specific types of flows, the network visualization application of some embodiments provides the ability for a user to select specific security groups and/or DCNs using the representation of those entities in the scalable UI. Returning to the state diagram of FIG. 2, in some embodiments, when the network visualization application receives through the UI a selection to highlight a particular security group and its associated network flows, the application transitions to state 220 to highlight the selected security group and its associated network flows in the UI display. For example, the application provides a scalable UI display such as scalable UI display 400 in FIG. 4 featuring a highlighted security group 415 and only the flows associated with the highlighted security group 415. In some embodiments, these flows include any flow between (i) any DCN in the selected security group and (ii) any DCN outside the selected security group. In some embodiments, to reduce clutter within the UI display, the flow lines (as shown in FIG. 4) do not indicate the specific DCNs involved in each flow, and instead indicate a number of flows between the selected security group and each other security group for which there is at least one flow (as is also the case in FIG. 1). For example, the scalable UI display 400 shows there is one flow between the highlighted security group 415 and security group 418, but does not indicate the specific DCNs involved.

In some embodiments, the network visualization application may receive additional input from a user at state 220. For example, network visualization application may receive a selection to add or remove from the UI display any one, or combination, of (i) allowed flows for the selected security group, (ii) blocked flows for the selected security group, and (iii) unsecured flows for the selected security group. When the network visualization application receives a selection to add a particular flow type to the UI display, the application transitions to 242 to add the selected flow types for the selected security group to the display. Alternatively, when the network visualization application receives a selection to remove a particular flow type from the UI display, the application transitions to 252 to remove the selected (i.e., deselected) flow type for the selected security group from the display.

Figure 5A:
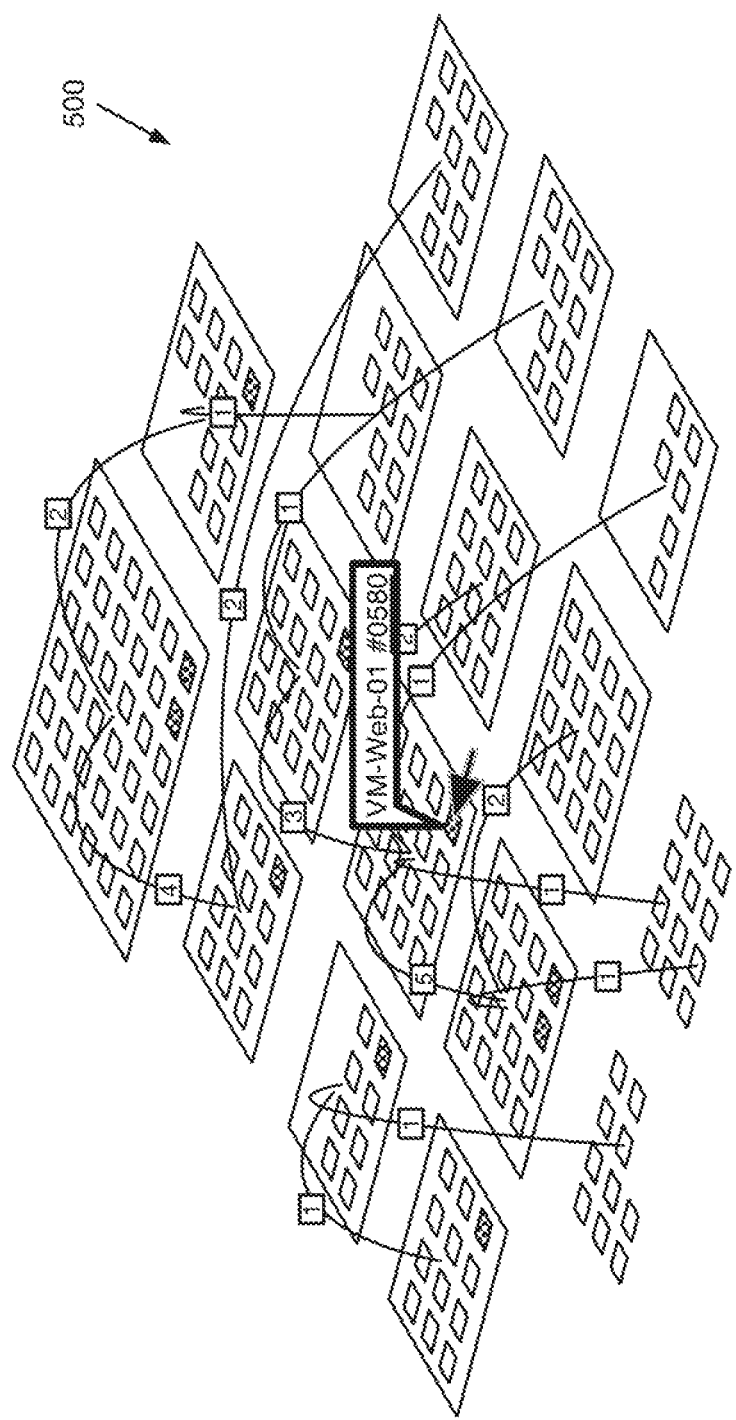
FIGS. 5A-5B conceptually illustrate different states of the scalable user interface display in which a user selects a particular VM according to some embodiments.

In some embodiments, a user may select an individual DCN and its flows to be highlighted in the UI display. In some such embodiments, hovering a cursor over a DCN to be selected will cause the network visualization application to display a graphic over the DCN that includes information about the DCN (e.g., name of the DCN). For instance, FIG. 5A illustrates a UI display 500 in which a cursor hovers over a particular DCN that includes a graphic "VM-Web-01" (580) indicating the name of the DCN (which in this case indicates that the DCN is a web VM). In some embodiments, hovering a cursor over a particular DCN may cause multiple identical graphics to appear over multiple DCNs of any number of security groups. In some such embodiments, this is an indication that the particular DCN belongs to each of the security groups that includes a DCN for which the graphic appears. Such instances will be discussed in further detail below with reference to FIGS. 6 and 7B.

Figure 5B:
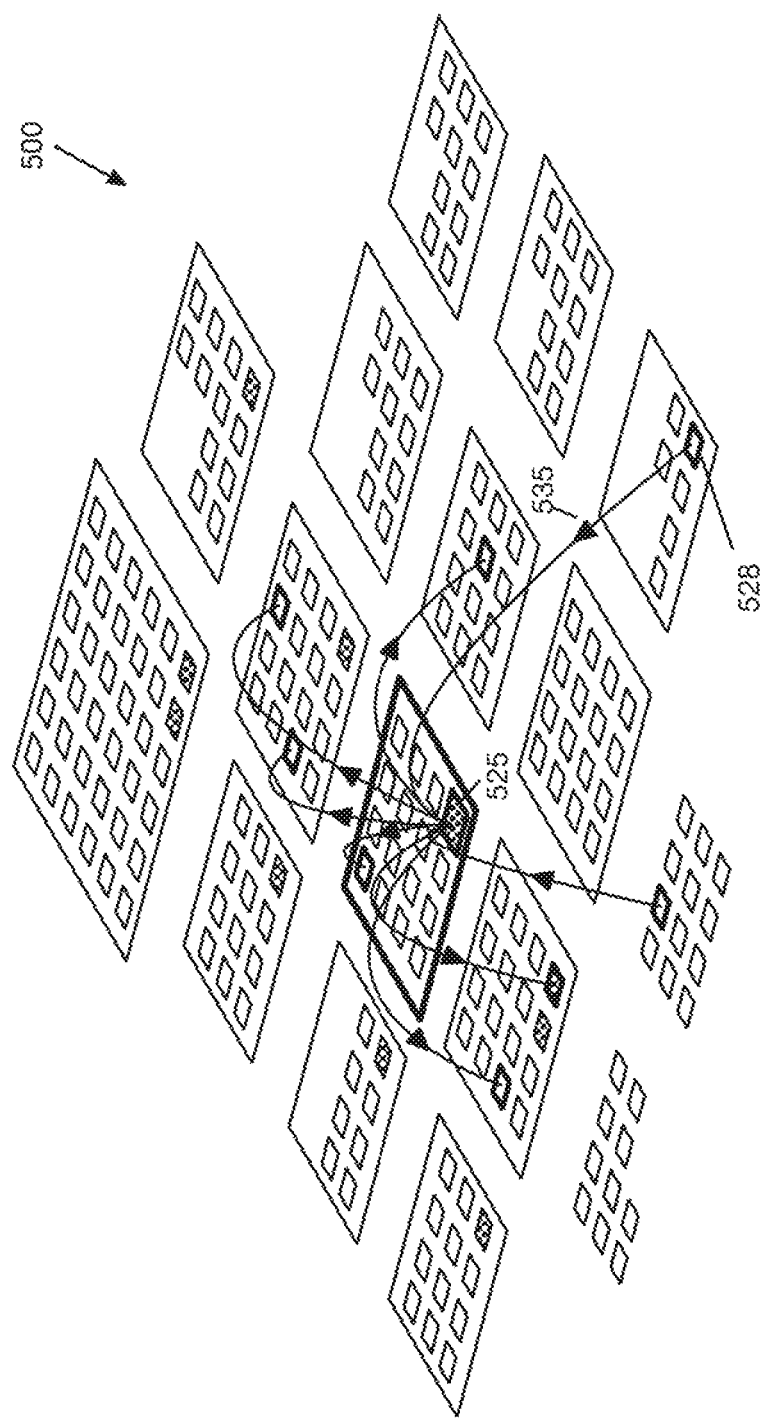

Returning to state diagram 200, in some embodiments, when the network visualization application receives a selection to highlight a DCN and its flows, the application transitions from state 210 to state 230 to highlight the selected DCN and its flows in the UI display. For example, FIG. 5B illustrates the UI display 500 after a user has selected the particular DCN 525. As shown, DCN 525 appears larger and more defined, and only flows to and from the DCN 525 are displayed, though in some embodiments, the selected DCN may be distinguished in a different way (e.g., different color). In some embodiments, selecting a DCN will further cause the network visualization application to distinguish DCNs with which the selected DCN communicates within the display in order to provide a clearer visualization of DCNs with which the selected DCN is communicating. For example, each of the DCNs with which selected DCN 525 communicates in the embodiment of FIG. 5B are illustrated using a thicker outline, while other embodiments may illustrate the DCNs using other methods (e.g., different color, different size, etc.). Whereas in the other displays, flows were shown between security groups without specifying particular DCNs, selecting a DCN allows a user to view the specific DCNs between which the flows exist. For example, FIG. 5B illustrates a flow between the selected DCN 525 and another DCN 528. As a result in some embodiments, the notations accompanying the flow lines indicating a number of flows is rendered unnecessary.

In some embodiments, the network visualization application may indicate the direction of the flows associated with the selected DCN in the UI display. As illustrated by FIG. 5B, each of the flow lines between the selected DCN and DCNs with which it communicates include an arrow (e.g., 535) representing the direction of the flow. While FIG. 5B includes only unidirectional flow lines, some embodiments may include bidirectional flow lines represented by arrows on the flow lines facing both to and from the selected DCN. Other embodiments display separate lines for flows in two directions, or only treat flows as having a single direction (e.g., based on which DCN initiates the flow).

In some embodiments, while at state 230, the network visualization application may receive additional input from a user. Similar to what was described above with reference to state 220, for example, network visualization application may receive a selection to add or remove any one, or combination, of (i) allowed flows for the selected DCN, (ii) blocked flows for selected DCN, and (iii) unsecured flows for the selected DCN. When the network visualization application receives a selection to add a particular flow type to the UI display, the application transitions to state 244 to add the selected flow type for the selected DCN to the display. Alternatively, when the network visualization application receives a selection to remove a particular flow type from the UI display, the application transitions to 254 to remove the selected (i.e., deselected) flow type for the selected security group from the display. One of ordinary skill in the art will recognize that although only a subset of the selections have been illustrated and described herein, any number of combinations of selections and views may be selected by a user.

As mentioned, the network visualization application of some embodiments displays both existing security groups as well as a set of recommended security groups that are based on monitored network flows in the network. In some embodiments, a network manager (e.g., a network virtualization manager) that monitors network flows between the plurality of security groups provides data regarding the network flows to the visualization application (which may be incorporated into the network manager or operate as a separate application). In some embodiments, the UI includes a tool that enables a user to define a subset of the plurality of security groups, or a subset of DCNs, to be monitored by the network manager.

Within this UI, some embodiments provide a tool for further defining security groups. For example, in some embodiments, the user interface tool enables a user to accept recommended security groups to be part of the set of existing security groups and/or add DCNs from the recommended security groups to the existing security groups. In addition, some embodiments further allow the user to provide instructions to remove a particular existing security group or merge a recommended security group with an existing security group. Security rules (i.e., firewall rules), in some embodiments, are defined and implemented in the network for DCNs belonging to existing security groups. As mentioned, some embodiments display recommended security rules along with the recommended security groups.

Figure 6:
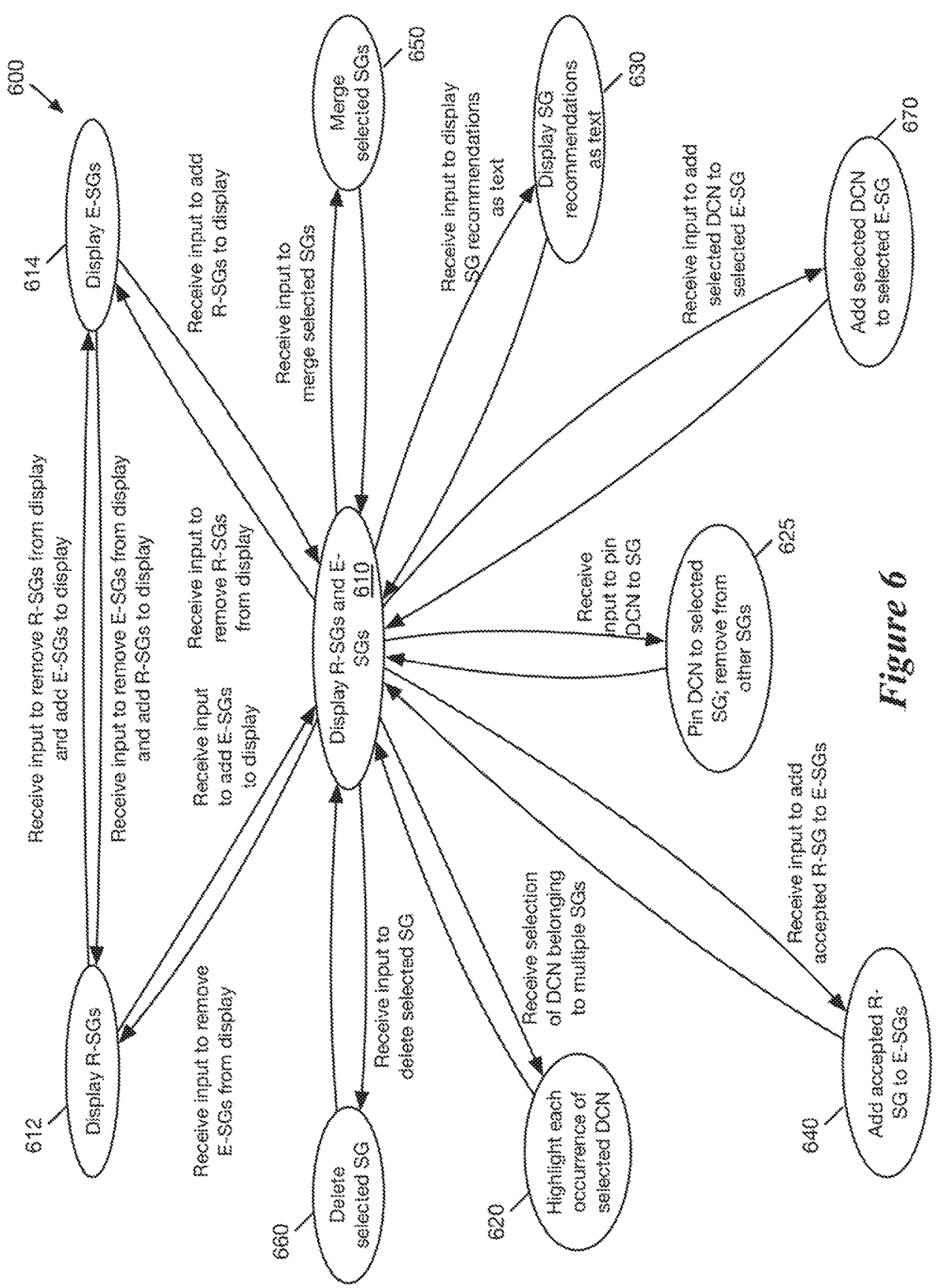
FIG. 6 conceptually illustrates a state diagram describing different states and transitions between these states of the scalable user interface display for each of existing security groups, recommended security groups, and existing and recommended security groups.

FIG. 6 illustrates a state diagram 600 describing additional different states of the scalable UI and transitions between these states of some embodiments. One of ordinary skill in the art will recognize that the application of some embodiments will have many different states relating to all different types of input events, and that the state diagram 600 is specifically focused on a subset of these events. One of ordinary skill in the art will further recognize that various interactions, such as cursor controller gestures and button clicks, keyboard input, touchpad/trackpad input, etc., may be used for selection operations described herein. The state diagram 600 will be described by reference to FIGS. 7A-G.

In some embodiments, the network visualization application is initially in one of states 610, 612, or 614, featuring a scalable UI display of security groups. These security groups can include recommended and/or existing security groups. Existing security groups are those for which a user (e.g., a network administrator) has defined the security group, while recommended security groups are those that the application has recommended based on analysis of flows (e.g., to perform microsegmentation). Some embodiments automatically begin in state 610, showing both recommended and existing security groups (e.g., UI display 700). From state 610, a user can perform numerous operations to modify the UI display and perform various actions on the network entities represented therein (e.g., via various types of interactions with the representations of the entities in the UI).

Figure 7A:
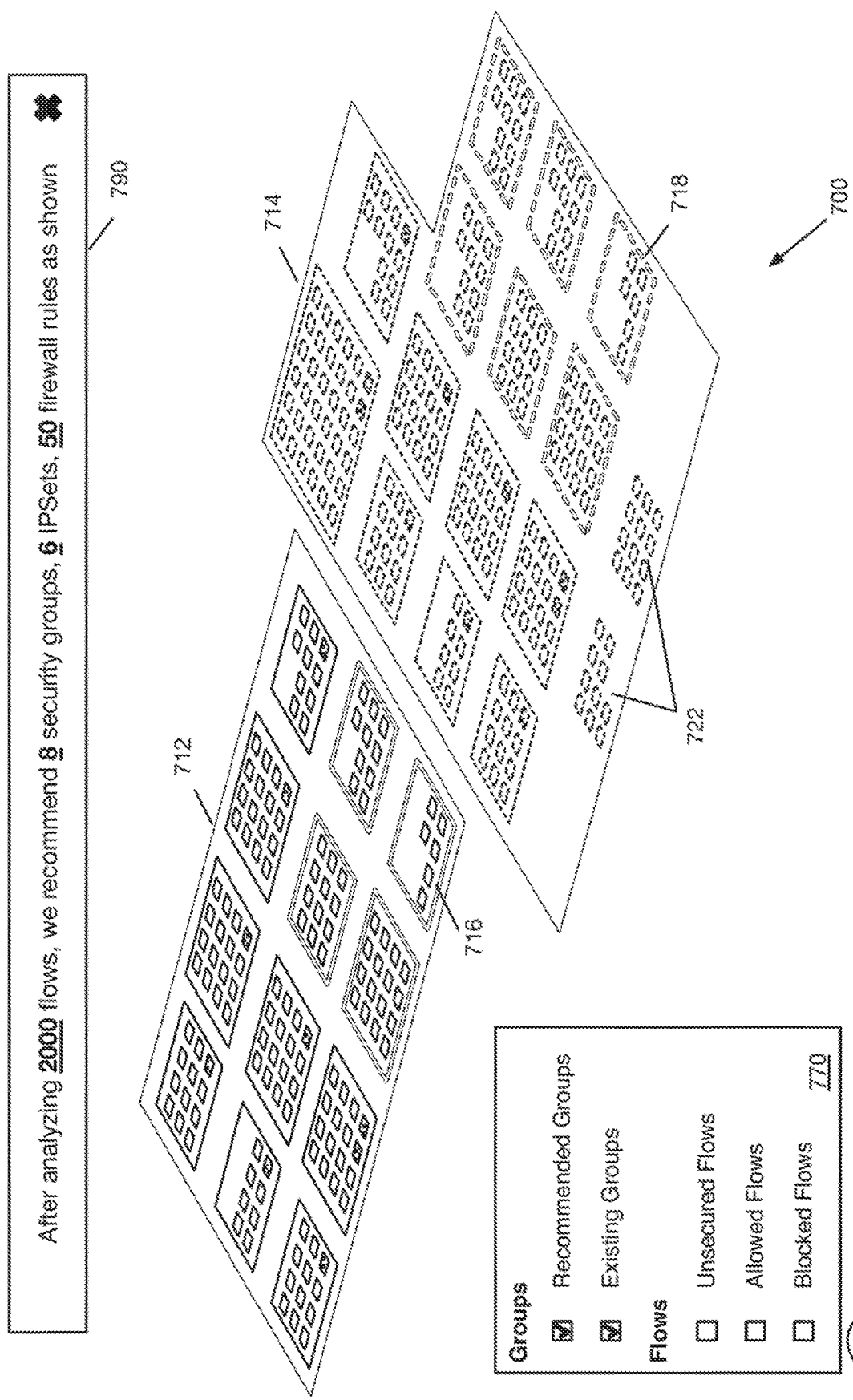
FIGS. 7A-G conceptually illustrate an example of a scalable user interface in various states.

FIG. 7A illustrates an example UI display 700 featuring a filtering tool 770. In addition to the flow types shown in filtering tool 370 described above, filtering tool 770 further includes options to display security groups by type (e.g., recommended and existing). While the example embodiment UI display 700 of FIG. 7A shows both types of security groups selected and no flow types selected, any combination of selections may be displayed (and the transitions shown in FIG. 2 above would apply here as well).

In some embodiments, when the network visualization application receives input to remove existing security groups (E-SGs) from the display (e.g., deselect existing security groups in the filtering tool), the application transitions from state 610 to state 612 to remove the existing security groups from the display, leaving only the recommended security groups (R-SGs) in the UI display. At state 612, when the network visualization application receives input to add existing security groups to the display, the application transitions back to state 610. Alternatively, when the network visualization application receives input at state 612 to remove recommended security groups from the display and add existing security groups to the display, the application transitions to state 614 to display only existing security groups. At state 614, when the network visualization application receives input to add recommended security groups to the display, the application transitions again to state 610 to display both recommended security groups and existing security groups.

Similarly, when the network visualization application receives input to remove recommended security groups from the display, the application transitions from state 610 to state 614 to display only existing security groups. When the network visualization application receives input to remove existing security groups from the display and add recommended security groups to the display, the application transitions to state 612 to display only recommended security groups. At state 612, when the network visualization application receives input to add existing security groups to the display, the application again returns to state 610 to display both recommended and existing security groups. That is, the application can make any transition between states 610, 612, and 614 based on user input via the filter tool 770. While not shown, in some embodiments, a user may deselect both existing and recommended security groups from the display such that no security groups are displayed.

In some embodiments, the network visualization application may receive additional input from a user while at any of states 610, 612, and 614. For simplicity, FIG. 6 only shows operations received while at state 610 (with both recommended and existing security groups displayed), but the majority of these actions can occur when only recommended or only existing security groups are displayed. It should be noted, though, that certain actions (e.g., displaying security group recommendations as text, adding a recommended security group to an existing security group, etc.) can only be performed when the recommended and/or existing security groups are displayed.

For example, when the network visualization application receives input to display security group recommendations as text, the application transitions to state 630. For instance, FIG. 7A illustrates such an embodiment in which the UI display 700 features a set of recommendations in a banner 790. As shown, in this example the banner 790 indicates that the network visualization application recommends 8 security groups, 6 IPSets, and 50 firewall rules after analyzing 2000 flows. In some embodiments, the network visualization application displays the recommended security groups and recommendation information based on flow monitoring performed on the network (e.g., by the application or a back-end controller or other application that provides data to the network visualization application).

The UI display 700 of FIG. 7A additionally illustrates a set of existing security groups and IPSets 712, a set of recommended security groups and IPSets 714, and filtering tool 770 as described above. In order to provide a visual distinction between the existing and recommended security groups and IP sets, each of the entities in the existing groups are depicted using solid lines, whereas all of the entities in the recommended set are depicted using dashed lines. To further provide a visual distinction between recommended and existing groups, the embodiment illustrated by FIG. 7A includes additional boundary lines around the set of existing groups and the set of recommended groups. In some other embodiments, the UI display features no additional boundary lines to separate existing and recommended groups. Additionally, to provide visual distinction between security groups and IP sets, each of the IP sets are illustrated with a double boundary line (e.g., 716 and 718), while the security groups are illustrated with a single boundary line. Some embodiments may use different means of distinction for each of the entities displayed in the UI (e.g., different coloring, etc.). As mentioned above, some embodiments may display a subset of entities representing DCNs that have not yet been resolved into an existing or recommended security group or IP set (and therefore without specified firewall rules), such as DCNs 722.

Figure 7B:
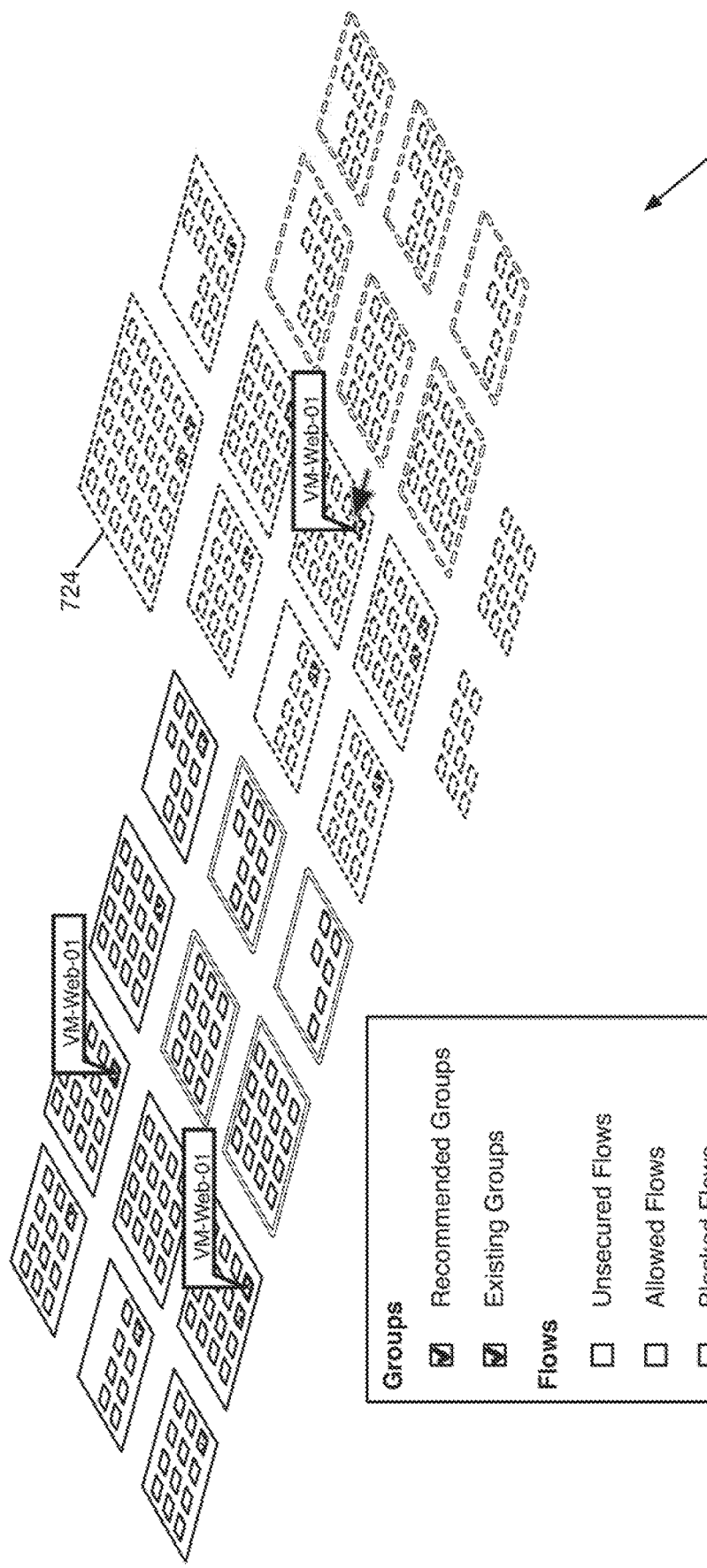

Returning to state diagram 600, in some embodiments, when the network visualization application receives a selection to highlight each occurrence of a DCN, the application transitions from state 610 to state 620 in order to highlight each occurrence of the selected DCN. As mentioned above, in some embodiments, when a DCN belongs to more than one security group, hovering a cursor over the DCN (or providing other input) causes the network visualization application to display a graphic over each occurrence of the DCN. FIG. 7B illustrates such an example embodiment. As illustrated, within the UI display 700, a cursor hovering over a particular DCN reveals two additional occurrences of the DCN in two of the existing security groups, each occurrence of the DCN including a graphic comprising "VM-Web-01". It should be noted that each of these occurrences of the DCN are not instances of the DCN, but rather a visual representation indicating each of the security groups to which the DCN belongs. When the DCN is selected (e.g., clicked on), the network visualization application of some embodiments causes each of the occurrences of the selected DCN to be highlighted (not shown).

In some embodiments, such as when a DCN is found to belong to more than one security group, a user may select to pin the DCN to a particular security group, and subsequently remove the DCN from the other security groups. When the network visualization application receives such a selection at state 610, the application transitions to state 625 to pin the DCN to the selected security group, and remove the DCN from each other security group to which it belonged (and then transitions back to state 610 after performing this action). In some embodiments, a user may select to pin a DCN to a particular security group for flow visualization purposes, while allowing the DCN to still remain a member of any number of other security groups.

Figure 7C:
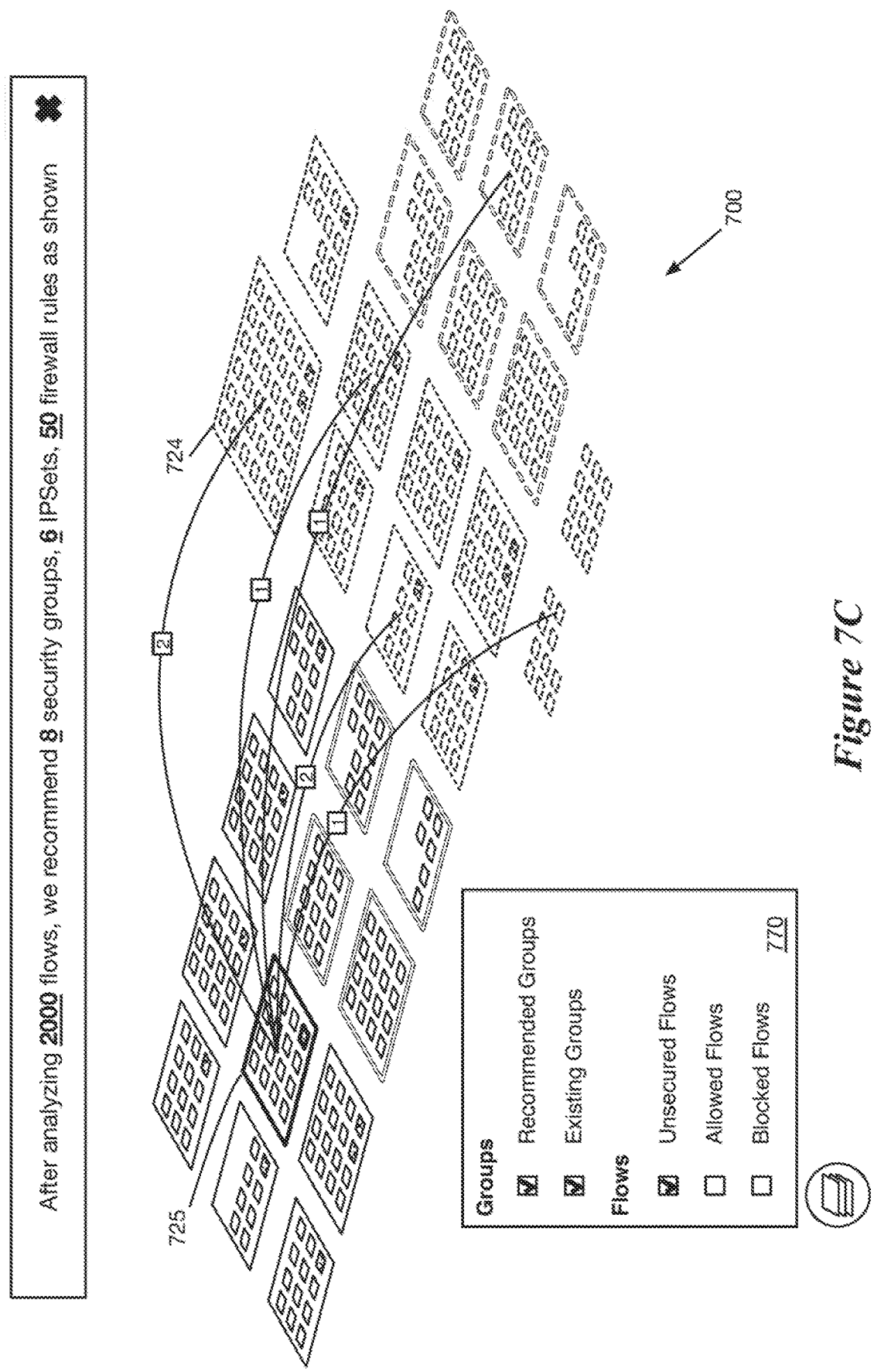

In some embodiments, a user may select to view particular flows between existing security groups and recommended security groups. FIG. 7C, for example, illustrates UI display 700 that includes both existing and recommended security groups, in which a particular existing security group 725 is selected (e.g., highlighted), and only unsecured flows for the selected security group are displayed based on a selection made in the filtering tool. As the selected security group is an existing security group, all of the unsecured flows are between the existing security group 725 and recommended security groups, indicating that any flows between existing security group 725 and any other existing security groups have already either been blocked or allowed (e.g., firewall rules have been defined). In some other embodiments, unsecured flows between existing security groups may appear if a user has yet to define security rules for a particular flow or flows, or if any changes have been made to the network topology. In some embodiments, a user may instead select any of the existing or recommended security groups to view any of the types of flows associated with the selected security group, or alternatively, to view any combination of flow types for all of the security groups.

Figure 7D:
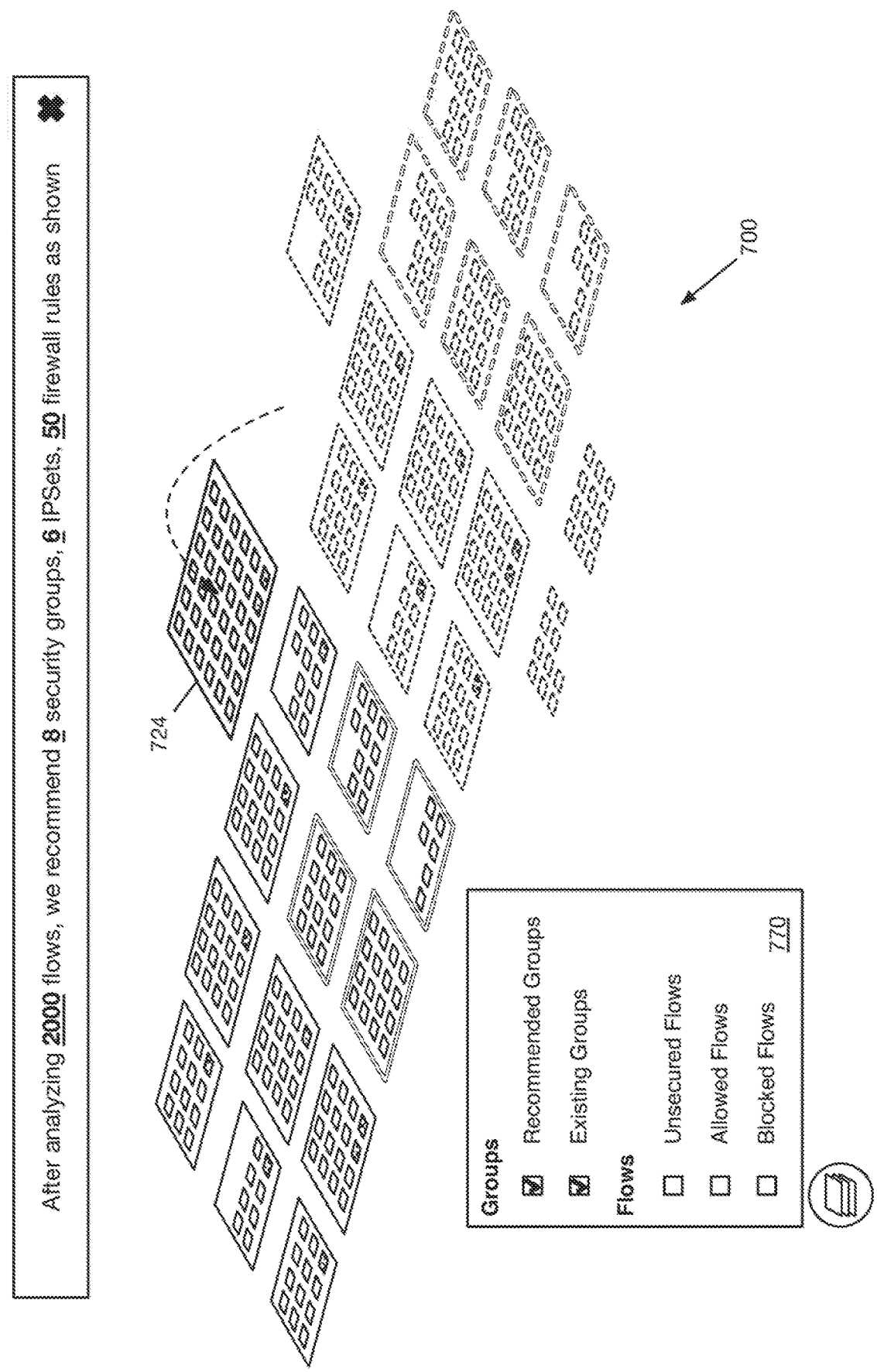

In some embodiments, when the network visualization application receives a selection to accept a recommended security group at state 610 (e.g., by dragging the representation of the recommended security group to the portion of the display with the existing security groups, by selecting an option in the display, etc.), the application transitions to state 640 to add the accepted recommended security group to the set of existing security groups (and then returns to state 610 when the action is completed). For instance, FIG. 7D illustrates such an acceptance of a recommended security group. As illustrated, security group 724 in the UI display 700 has been moved from the set of recommended security groups to the set of existing security groups, and is now depicted with solid lines instead of dashed lines. In some embodiments, as described above, differences between the existing and recommended security groups may be illustrated using other means, such as different colors. Additionally, while not shown, a user may also accept recommended IPSets to be added to the set of existing IPSets.

Figure 7E:
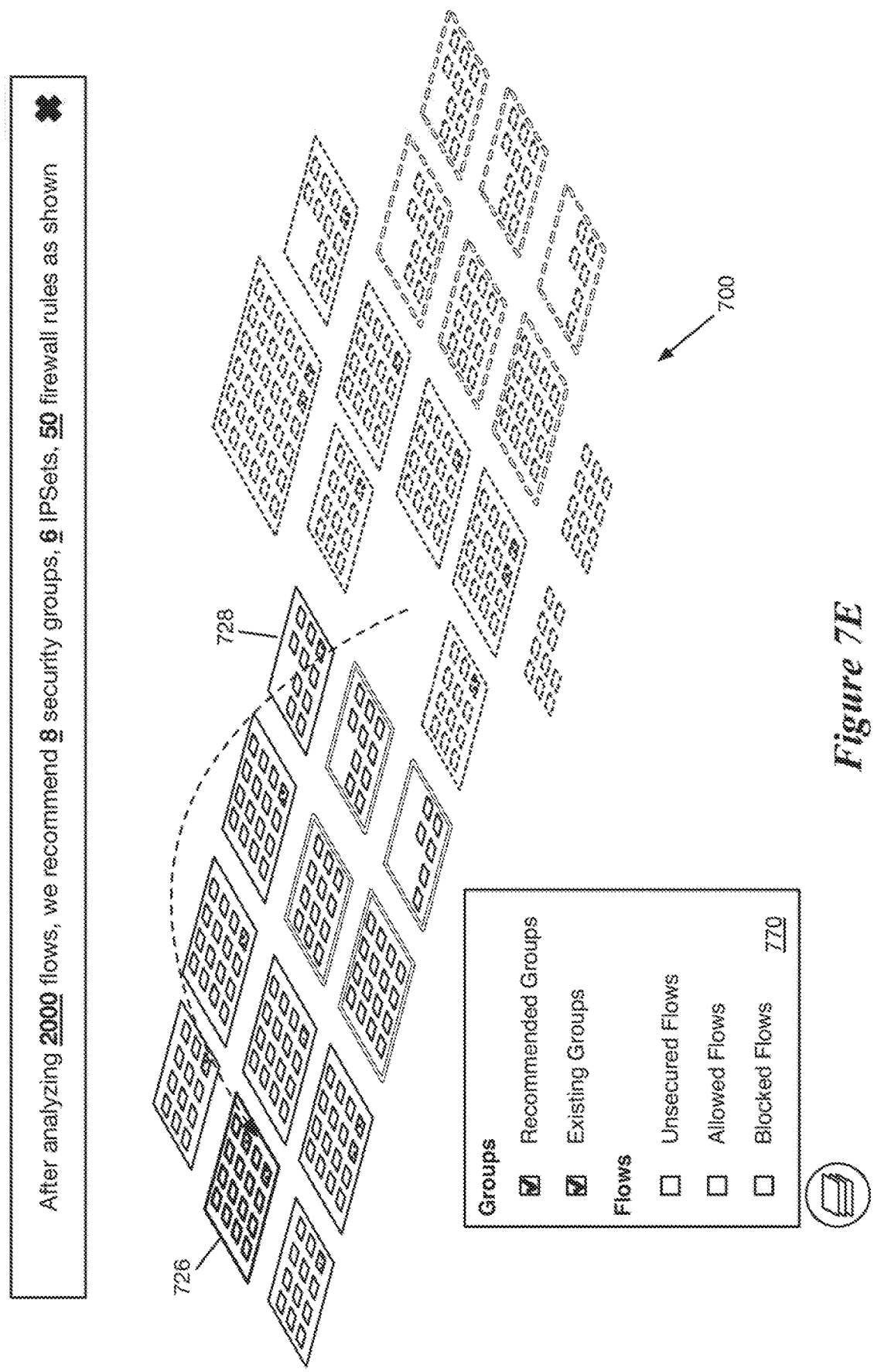

When the network visualization application receives a selection to merge two or more security groups at state 610 (e.g., via selection of an option in the display, dragging the representation of one security group onto the representation of another security group, etc.), the application transitions to state 650 to merge the selected security groups in some embodiments (and then returns to state 610 when the action is completed). For instance, FIG. 7E depicts the result of merging a recommended security group with an existing security group, resulting in security group 726. In some embodiments, a user may select to merge existing security groups, recommended security groups, existing IP sets, recommended IP sets, or any combination of recommended and existing security groups or IP sets.

Figure 7F:
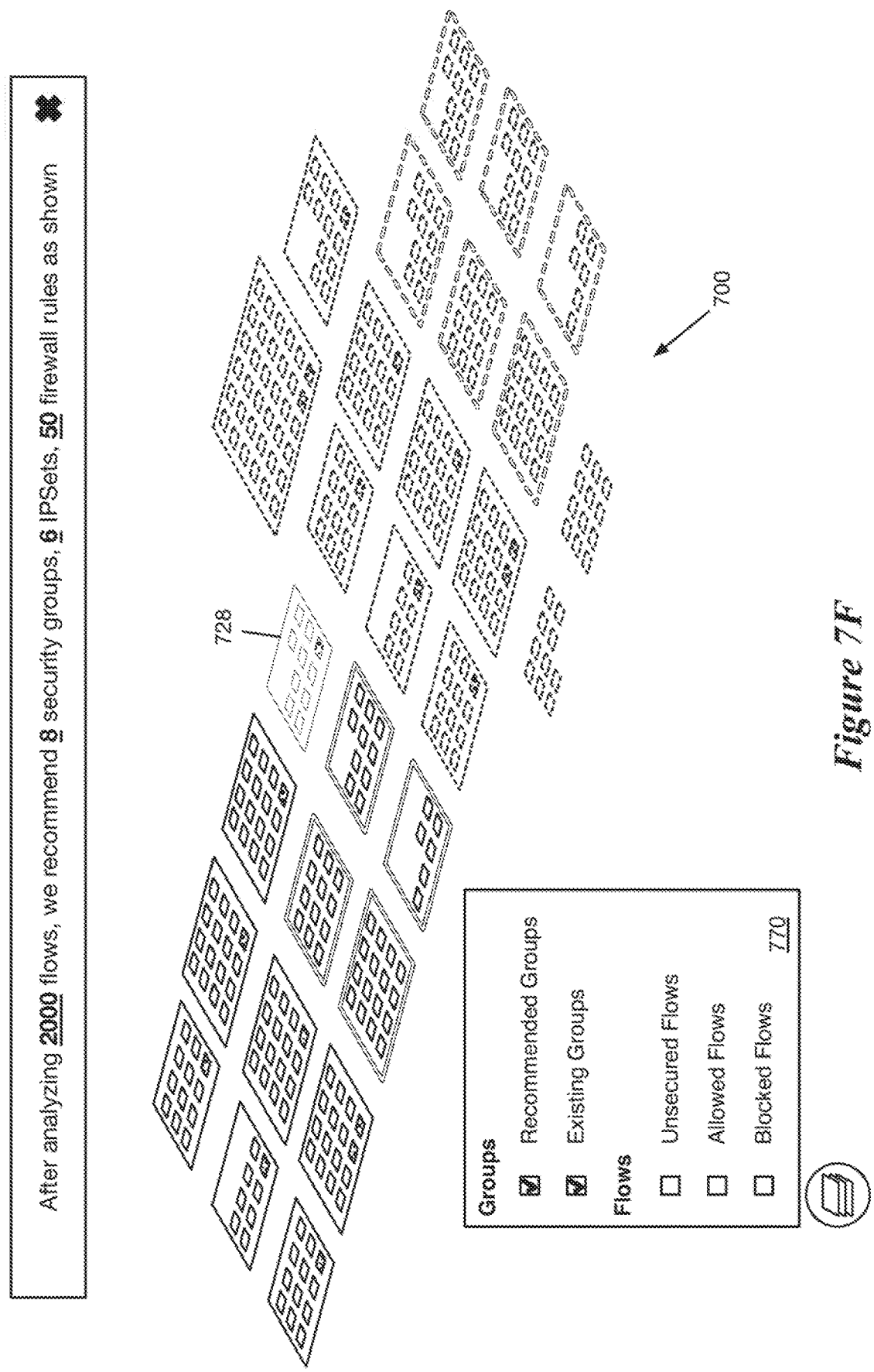

In some embodiments, when the network visualization application receives a selection to remove a security group at 610 (e.g., based on selection of an option in the display), the application transitions to state 660 to delete the selected security group from the set of security groups (and then returns to state 610 when the action is completed). FIG. 7F, for example, illustrates the deletion of a security group 728 (also shown in FIG. 7E), which remains faintly visible for illustrative purposes, according to some embodiments. While the deleted security group 728 is depicted as a belonging to the set of existing security groups, any one of the security groups or IP sets, either existing or recommended, may be removed.

Figure 7G:
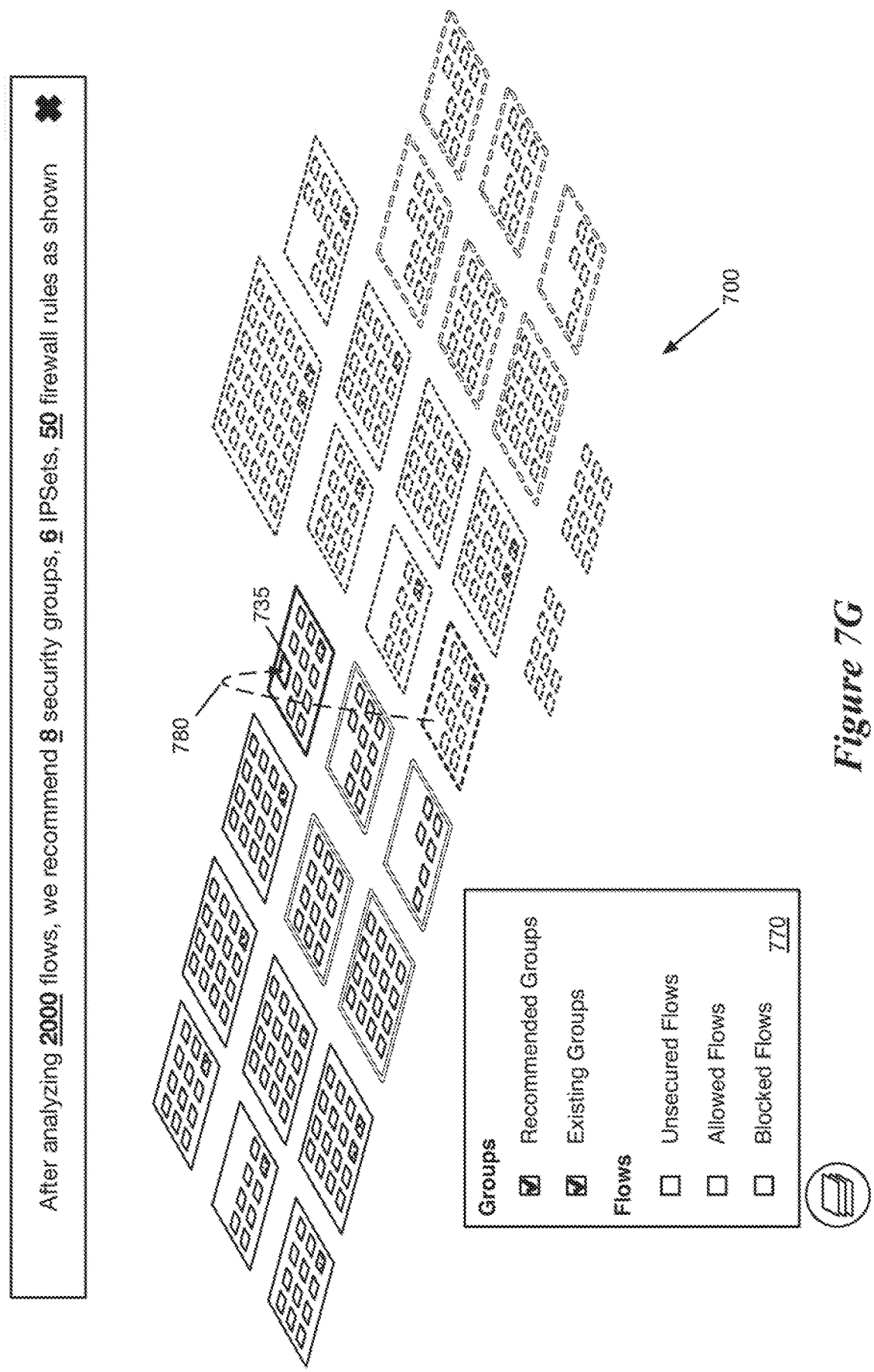

When the network visualization application receives a selection to add a DCN to a selected existing security group at state 610 (e.g., based on dragging the representation of the DCN to the representation of the existing security group), the application transitions to state 670 to add the DCN to the selected existing security group (and then returns to state 610 when the action is completed). FIG. 7G illustrates an example wherein a DCN 735 of a recommended security group has been moved to an existing security group (as illustrated by arrow 780). While the example of FIG. 7G illustrates DCN 735 being added to an existing security group, and simultaneously being removed from the recommended security groups, some embodiments may add the DCN to an existing security group while also accepting the recommended security group such that the DCN now belongs to two different security groups. In some other embodiments, a DCN belonging to an existing security group may be added to another existing security group, a DCN may be added to multiple different security groups, or any combination of these examples.

In some embodiments, the network visualization application provides a user interface tool for enabling a user to designate a subset of DCNs as seed nodes, where each seed node acts as a source node for micro-segmentation. In some embodiments, receiving input designating a subset of DCNs as seed nodes causes the network visualization application to display the designated subset of DCNs with an appearance that is different from the rest of the DCNs in the network (e.g., illustrated with a different color). For example, FIGS. 1, 3-4, and 7 each illustrate several DCNs that have been designated as seed nodes (e.g., DCN 525 of FIG. 5B), such that each of the seed nodes are depicted in the displays using cross-hatching to visually differentiate them from the rest of the DCNs in the displays. In some embodiments, by enabling a user to define seed nodes and view flows for specific DCNs, while also providing various UI tools for defining security groups in the network, performing micro-segmentation on the user-end is simplified.

Figure 8:
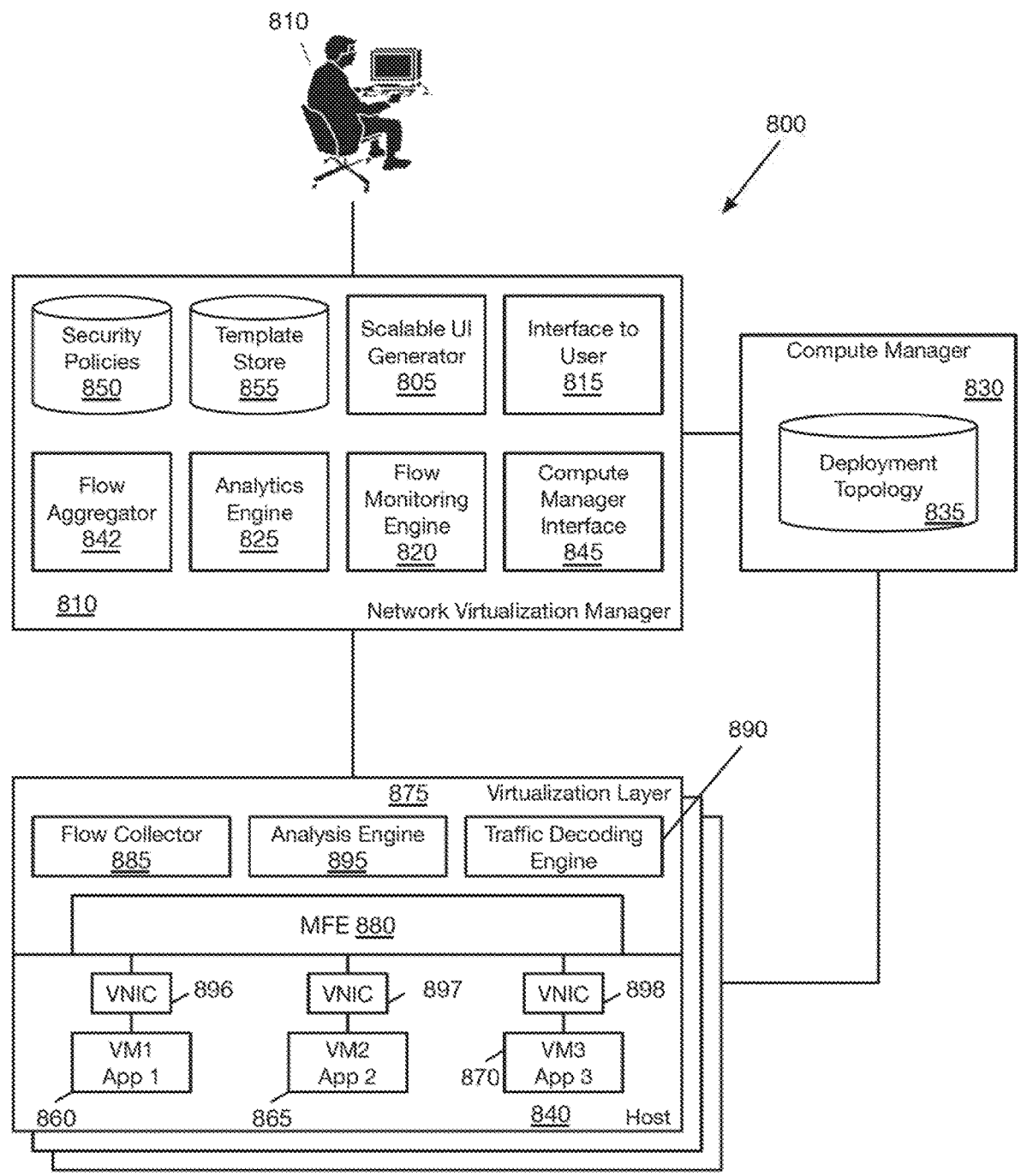
FIG. 8 conceptually illustrates a system for providing application visibility and identifying policies in a network in some embodiments.

As mentioned above, the network visualization application in some embodiments receives data regarding network flows from a network manager and/or controller that performs flow monitoring and analysis in order to provide application visibility and identify policies in a micro-segmentation environment. FIG. 8 conceptually illustrates a system 800 for providing application visibility and identifying policies in a micro-segmentation environment in some embodiments. As shown, the system includes a network virtualization manager 810, a compute manager 830, and several hosts 840 (e.g., physical host machines for hosting a set of VMs).

The network virtualization manager 810 in some embodiments is a virtualized server that is installed on one or more physical servers and is used to define and/or manage the networking resources of a datacenter. As shown, the network virtualization manager includes a flow monitoring engine 820, an analytics engine 825, a flow aggregator 842, a compute manager interface 845 to communicate with the compute manager 830, a scalable UI generator 805, and an interface to the user 815 for providing for display the scalable UI. The network virtualization manager also includes a storage 850 to store micro-segmentation security policies and a storage 855 for storing application templates that are built and used for generating micro-segmentation security policies.

In this example, the scalable UI display is part of the network virtualization manager 810, but it should be understood that in other embodiments the scalable UI is part of a separate network virtualization application that communicates with the network virtualization manager 810. The scalable UI generator 805 of some embodiments receives the flow information from the analytics engine 825 and flow aggregator 842, and generates the scalable UI display for the network virtualization application (i.e., the UIs shown in FIGS. 3-5 and 7A-G). The interface 815 provides this generated UI to the user (e.g., via a network connection, on the user's terminal, etc.).

The compute manager 830 in some embodiments is a virtualized server that is installed on one or more physical servers. The compute manager is used to manage compute infrastructure (e.g., the hosts and VMs) of a datacenter. As shown, the compute manager includes storage 835 to store the system deployment topology. For instance, the deployment topology indicates which VM is hosted on each host 840. The deployment topology in some embodiments also indicates the components of which applications are running by each VM 860-870. For instance, both VMs 860 and 870 may run components of the same application where VM 860 may run a web server and VM 870 may run an application server for the same 3-tiered enterprise application. Network virtualization manager 810 communicates with compute manager 830 through an interface 845 such as a plug-in and/or an application programming interface (API) in order to query the compute manager for the system deployment topology 835.

Each host 840 in some embodiments may include a virtualization layer 875 that includes virtualization software (e.g., a hypervisor) for virtualizing physical resources of the host machine. Each host may also include a host managed forwarding element (MFE) 880 for forwarding network traffic (e.g., data messages) to and from the virtual machines. In some embodiments, the host MFE 880 is configured to logically forward data messages according to logical forwarding elements (e.g., logical switches, logical routers) configured by an administrator of the network to implement a logical forwarding element (LFE) of a logical network. In some embodiments, the logical network is an abstract conception of a network generated by an administrator, and the logical network is implemented in a virtualized, distributed manner in a managed physical infrastructure (e.g., in a multi-tenant datacenter). That is, the VMs that connect to the LFEs may reside on various different host machines within the infrastructure, and MFEs (e.g., software virtual switches) operating on these host machines implement some or all of the logical forwarding elements (logical switches, logical routers, etc.).

In the virtualization field, some refer to software switches as virtual switches as these are software elements. However, in this specification, the software forwarding elements are referred to as MFEs, in order to distinguish them from LFEs, which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

In some embodiments, several MFEs distributed throughout the network implement tenant's LFEs, where each MFE is a local instantiation of an LFE that operate across different host machines and can perform Open Systems Interconnection (OSI) model Layer 2 (L2)/Layer 3 (L3) packet forwarding between VMs on the host machine or on different host machines. An LFE is sometimes referred to as a virtual distributed switch (VDS).

Each host also includes a traffic decoding engine 890, an analysis engine 895, and a flow collector 885. Traffic decoding engine, analysis engine, and flow collector in some embodiments are either a part of the MFE or are part of one or more entities such as a plugin or a filter that operates in conjunction with the MFE. Traffic decoding engine 890 decodes packet traffic, analysis engine 895 perform analysis such as deep packet inspection (DPI) on the packets, and flow collector 885 collects network packet flow information. Example of network packet flow information includes the following set of tuples: source Internet protocol (IP) address, destination IP address, source port identification, destination port identification, and protocol type. In some embodiment, such a set of tuples uniquely identifies each network packet flow.

The flow collector also collects additional information such as statistics (e.g., packet count) as well as the direction of each packet flow. In some embodiments, each VM 860-870 is connected to the MFE 880 through a virtual network interface card (VNIC) 896-898. The flow collector in some embodiments collects information for flows that enter or leave each VNIC. The direction of a flow (e.g., in or out) indicates whether the flow was entering or leaving the VNIC. The network virtualization manager 810 utilizes the collected flow information to analyze the flows and provide micro-segmentation policies (e.g., rules for a firewall that is distributed among the hosts and enforces firewall rules at several different enforcement points with the network (e.g., at the VNICs 896-898)).

Figure 9:
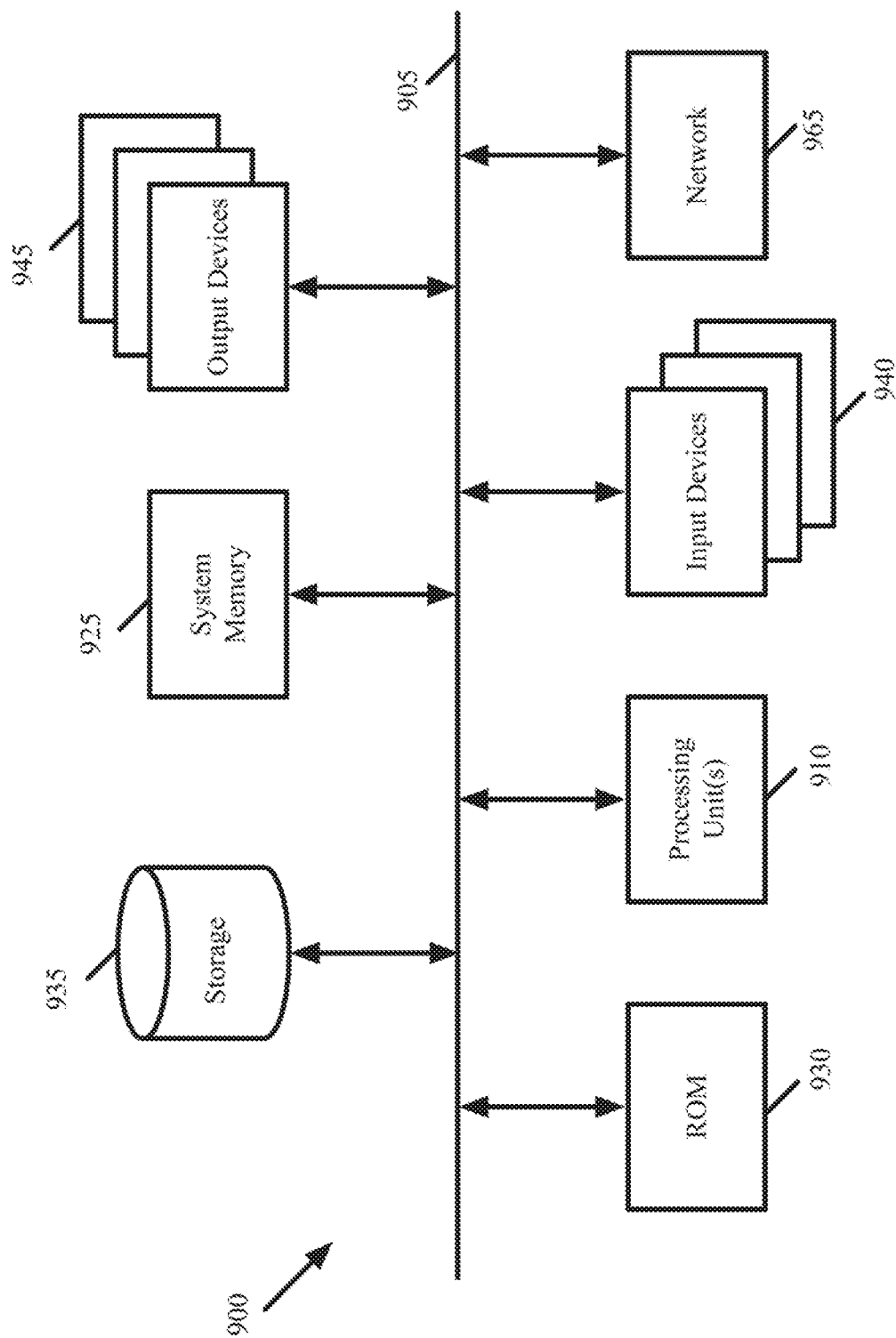
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses namespaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given may be any type of DCNs, including physical hosts, VMs, non-VM containers, and hypervisor kernel network interface modules. In fact, the example networks might include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2 and 6) conceptually illustrate state diagrams. The specific operations of these processes may not be performed in the exact order shown and described. The specific operations may not be performed in one continuous series of operations, and different specific operations may be performed in different embodiments. The specific operations may alternatively be performed simultaneously in some embodiments. Furthermore, the operations described in the state diagrams could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for defining security groups in a network, the method comprising:
   in a user interface, displaying (i) a set of existing security groups comprising virtual machines (VMs) for which security rules are defined and implemented in the network to enforce network policies and (ii) a set of recommended security groups that are recommended based on monitoring of network flows in the network and comprise VMs for which no security rules are yet defined, each existing security group and recommended security group comprising at least one VM; and
   providing a user interface tool for (i) accepting recommended security groups to be part of the set of existing security groups, (ii) adding VMs from recommended security groups to which the VMs are assigned based on the monitoring of network flows in the network to existing security groups, and (iii) merging a recommended security group with an existing security group such that all of the VMs assigned to the recommended security group based on the monitoring of network flows in the network are added to the existing security group based on input from a user, wherein security rules are defined and implemented in the network for VMs belonging to existing security groups and not for VMs that only belong to recommended security groups that have not been accepted as existing security groups.

2. The method of claim 1 further comprising:
   via the user interface tool, receiving acceptance of a particular recommended security group; and based on the acceptance, adding the particular recommended security group to the set of existing security groups.

3. The method of claim 1 further comprising receiving, via the user interface tool, addition of a particular VM to a particular existing security group.

4. The method of claim 3, wherein the particular VM was part of a particular recommended security group.

5. The method of claim 3, wherein the particular VM was not previously organized into a security group.

6. The method of claim 1 further comprising:
receiving, via the user interface tool, instructions to remove a particular existing security group; and
removing the particular existing security group from the set of existing security groups.

7. The method of claim 1 further comprising:
receiving, via the user interface tool, a merger of a particular recommended security group with a particular existing security group; and
adding the VMs of the particular recommended security group to the particular existing security group.

8. The method of claim 1, wherein a subset of the security groups comprises sets of IP addresses.

9. The method of claim 1, further comprising receiving, through the user interface, data designating a subset of the VMs as seed nodes, wherein each seed node acts as a source node for micro-segmentation.

10. The method of claim 1, further comprising displaying a set of recommended security rules.

11. The method of claim 10, wherein the security rules that are defined and implemented in the network for VMs belonging to existing security groups comprise at least one recommended security rule from the set of recommended security rules.

12. The method of claim 1, wherein a subset of VMs comprises unresolved VMs (i) that have not been organized into any one of the plurality of existing or recommended security groups and (ii) for which security rules have not been defined.

13. A non-transitory machine readable medium storing a program which when executed by at least one processing unit defines security groups in a network, the program comprising sets of instructions for:
in a user interface, displaying (i) a set of existing security groups comprising virtual machines (VMs) for which security rules are defined and implemented in the network to enforce network policies and (ii) a set of recommended security groups that are recommended based on monitoring of network flows in the network and comprise VMs for which no security rules are yet defined, each existing security group and recommended security group comprising at least one VM; and
providing a first user interface tool for (i) accepting recommended security groups to be part of the set of existing security groups, (ii) adding a VM from a recommended security group to which the VM is assigned based on the monitoring of network flows in the network to an existing security group based on input from a user, wherein security rules are defined and implemented in the network for VMs belonging to existing security groups and not for VMs that only belong to recommended security groups that have not been accepted as existing security groups, wherein a particular VM belongs to both a particular recommended security group and a particular existing security group; and
providing a second user interface tool for simultaneously highlighting in the user interface representations of the particular VM within both the particular recommended security group and the particular existing security group.

14. The non-transitory machine readable medium of claim 13, wherein the particular recommended security group is a first security group, the program further comprising sets of instructions for:
via the first user interface tool, receiving acceptance of a second recommended security group; and
based on the acceptance, adding the second recommended security group to the set of existing security groups.

15. The non-transitory machine readable medium of claim 13, wherein the particular VM is a first VM and the particular existing security group is a first security group, the program further comprising a set of instructions for receiving, via the first user interface tool, addition of a second VM to a second existing security group.

16. The non-transitory machine readable medium of claim 15, wherein the particular recommended security group is a first recommended security group, wherein the second VM was part of a second recommended security group.

17. The non-transitory machine readable medium of claim 13, wherein the program further comprises sets of instructions for:
receiving, via the user interface tool, instructions to remove the particular existing security group; and
removing the particular existing security group from the set of existing security groups.

18. The non-transitory machine readable medium of claim 13, wherein the program further comprises sets of instructions for:
receiving, via the user interface tool, a merger of the particular recommended security group with the particular existing security group; and
adding to the particular existing security group the VMs of the particular recommended security group that do not already belong to the particular existing security group.

19. The non-transitory machine readable medium of claim 13, wherein the program further comprises a set of instructions for receiving, through the user interface, data designating a subset of the VMs as seed nodes, wherein each seed node acts as a source node for micro-segmentation.

20. The non-transitory machine readable medium of claim 13, wherein a subset of VMs comprises unresolved VMs (i) that have not been organized into any one of the plurality of existing or recommended security groups and (ii) for which security rules have not been defined.

* * * * *